United States Patent [19]

Iketani et al.

[11] Patent Number: 4,760,378
[45] Date of Patent: Jul. 26, 1988

[54] METHOD AND APPARATUS FOR CONVERTING A RUN LENGTH LIMITED CODE

[75] Inventors: Akira Iketani, Higashiosaka; Chojuro Yamamitsu, Kawanishi; Kunio Suesada, Ikoma; Ichiro Ogura, Hirakata, all of Japan

[73] Assignee: Matsushita Electric Industrial Co., Ltd., Osaka, Japan

[21] Appl. No.: 719,629

[22] Filed: Apr. 3, 1985

[30] Foreign Application Priority Data

May 21, 1984 [JP] Japan .................................. 59-102138
Sep. 6, 1984 [JP] Japan .................................. 59-186705

[51] Int. Cl.$^4$ .............................................. H03M 7/00
[52] U.S. Cl. .............................................. 340/347 DD
[58] Field of Search .................. 340/347 DD; 360/40; 375/25

[56] References Cited

U.S. PATENT DOCUMENTS

| | | |
|---|---|---|
| 3,689,899 | 7/1972 | Franaszek . |
| 4,146,909 | 8/1979 | Beckenhauer et al. . |
| 4,398,225 | 4/1983 | Cornaby et al. . |
| 4,486,739 | 6/1984 | Franaszek et al. . |
| 4,501,000 | 2/1985 | Immink ........................ 340/347 DD |
| 4,554,529 | 9/1985 | Moriyama et al. . |

OTHER PUBLICATIONS

Artigaras, "8/16: A New Channel Coding for Digital VTR," 12th International Television Symposium and Technical Exhibition, Program of Equipment Innovations Sections, (1981), pp. 261-265.
Horiguchi et al., "An Optimization of Modulation Codes in Digital Recording," IEEE Trans. MAG., vol. 12, No. 6, (Nov. 1976), pp. 740-742.
Jacoby, "A New Look Ahead Code for Increased Data Density," IEEE Trans. MAG., vol. 13, No. 5, (Sep. 1977), pp. 1202-1204.
Tang et al., "Block Codes for a Class of Constrained Noiseless Channels," Information and Control 17, No. 5, (1970), pp. 436-461.
Franaszek, "Sequence-State Methods for Run-Length-Limited Coding," IBM Journal of Research and Development, vol. 14, No. 4, (Jul. 1970), pp. 376-383.
Horiguchi et al., "A Modulation Code Construction Method in Digital Recording," N.E.C. Research & Development, No. 44, (Jan. 1977), pp. 34-40.
Patel, "Charge-Constrained Byte-Oriented (0,3) Code," IBM Technical Disclosure Bulletin, vol. 19, No. 7, (Dec. 1976), pp. 2715-2717.

Primary Examiner—Charles D. Miller
Attorney, Agent, or Firm—Spencer & Frank

[57] ABSTRACT

A systematic method and apparatus for constructing a run length limited code in which the minimum number of continuous bits of the same binary value is constrained to d and the maximum number thereof is constrained to k.

In converting m-bit data words to n-bit code words (n>m) to construct the run length limited code, selection means for n-bit code words usable to meet the d, k-constraint and a concatenation rule of the code words selected by the selection means are introduced.

The selection means divides each of $2^n$ n-bit bit sequences into a leading block L having l continuous bits of the same binary value, an end block R having $\gamma$ continuous bits of the same binary value and an intermediate block B having $b(=n-l-\gamma)$ bits between the blocks L and R.

Only those n-bit bit sequences in which the blocks B thereof completely meet the d, k-constraint and the blocks L and R thereof meet conditions uniquely defined for given d and k are used as the code words. Consequently, a systematic method for constructing the run length limited code is provided.

85 Claims, 35 Drawing Sheets

| LB | $F_1$ | $INV_1$ | CODE WORDS ASSIGNMENT |
|----|----|------|------------------------|
| X  | 0  | 0    | ONE DATA WORD TO ONE CODE WORD |
| 0  | 1  | 1    | ONE DATA WORD TO A CODE WORD IN WHICH 1ST BIT IS 1 AND INVERTED CODE WORD. |
| 1  | 1  | 0    |  |

| LB | $E_2$ | $F_2$ | $INV_2$ |
|----|----|----|------|
| 1  | X  | 0  | 0    |
| 0  | X  | 0  | 1    |
| 1  | 1  | 1  | 1    |
| 1  | 0  | 1  | 0    |
| 0  | 1  | 1  | 0    |
| 0  | 0  | 1  | 1    |

FIG. 7(a)

```
No.  Codes(Data)
  1  11000(00)
  2  11111(01)
  3  11111110000(1000)
  4  1111000000(1001)
  5  111000000(1010)
  6  111111111(1011)
  7  1111000000001111(110000)
  8  11100000000111(110001)
  9  111000001111(110010)
 10  111000001111(110011)
 11  1111000001111(110100)
 12  111110000111(110101)
 13  11111111110000(110110)
 14  111100000000000(110111)
 15  11100000000000(111000)
 16  1110000011111110000(1110100)
 17  11100000111111110000(1110101)
 18  11110000111111110000(1110110)
 19  11111100000111110000(1110111)
 20  11100000111111000000(1110100)
 21  11100000000111110000(1110101)
 22  1110000011110000000(1110101)
 23  11110000000000001111(1110101)
 24  11000000111110000(1110100)
 25  11000000111110000000(1110101)
 26  11000011111000000(1110110)
 27  11100000000000001111(1110111)
 28  11100000111111111(1110000)
 29  11100000111111111111(1110001)
 30  11100000111111111111(1110010)
 31  11111111100000111(1110011)
 32  11100000111100000001111(1110100000)
 33  11100000111110000000011111(11110100001)
 34  11100000000111100000111(11110100010)
 35  11100000111100000001111(11110100011)
 36  11100000111100000001111(11110100100)
 37  111000000001111100000111(11110100101)
 38  111000000111110000011111(11110100110)
 39  11100000111110000011111(11110100111)
 40  11100000111100000011111(11110101000)
 41  11100000111110000011111(11110101001)
 42  11100000111110000011111(11110101010)
 43  11100000111100000111111(11110101011)
 44  111100000111110000011111(11110101100)
 45  111100000111100000111111(11110101101)
```

FIG. 7 (b)

| No. | Codes (Data) |
|---|---|
| 46 | 1111100000111110000011111(1111011110) |
| 47 | 111000001111111111110000(111101111) |
| 48 | 11110000000000000011111(111100000) |
| 49 | 111000001111111111110000(111100001) |
| 50 | 111100000111111111110000(111100010) |
| 51 | 1111111111000001111110000(111100011) |
| 52 | 11110000000000000001111(111100100) |
| 53 | 111100000000000001111(111100101) |
| 54 | 11100000111111100000000000(111100110) |
| 55 | 11110000000000011110000(111100111) |
| 56 | 1111100000111110000000000(111101000) |
| 57 | 11100000000000000001111(111101001) |
| 58 | 111100000000000000001111(111101010) |
| 59 | 11110000000000000000111(111101011) |
| 60 | 1110000000000011110000(111101100) |
| 61 | 11100000111110000000000(111101101) |
| 62 | 111000001111000000000000(111101110) |
| 63 | 110000000000000000001111(111101111) |
| 64 | 1110000000000000000001111(111110000) |
| 65 | 111100000000000000001111(1111110001) |
| 66 | 1111100000000000000111111(11111001000) |
| 67 | 1111111110000000000000001111(11111001001) |
| 68 | 1110000011110000011111110000(11111001010) |
| 69 | 1110000011111000011111110000(11111001011) |
| 70 | 11100000111111100000111110000(11111001100) |
| 71 | 1110000111111100000111110000(11111001101) |
| 72 | 11100000111110000011111110000(11111001110) |
| 73 | 1110000011111111000001111110000(11111001111) |
| 74 | 111100000111110000011111110000(11111010000) |
| 75 | 111100000111111000001111110000(11111010001) |
| 76 | 11111100000111110000011111110000(11111010010) |
| 77 | 111000000000000011111111111(1111111010011) |
| 78 | 111111111000000000000000011(11111010100) |
| 79 | 11100000111110000011111110000(11111010101) |
| 80 | 11100000111110000011111000000(11111010110) |
| 81 | 1110000111111000001111100000(11111010111) |
| 82 | 11110000111110000001111110000(11111011000) |
| 83 | 11110000000111110000011110000(11111011001) |
| 84 | 1111100000111110000011111000000(11111011010) |
| 85 | 11100000111110000000000111(11111011011) |
| 86 | 1110000000000000011111111(11111011100) |
| 87 | 1110000011111000000000000111(11111011101) |
| 88 | 1111000000000000011110000011(11111011110) |
| 89 | 11111111100000000000000011(11111011111) |
| 90 | 111000000111111000000011110000(111111100000) |

FIG. 7(c)

```
No.    Codes (Data)
 91    1110000011111000000001111 10000(1111111100001)
 92    1110000000011110000011111 10000(1111111100010)
 93    1110000011111000000111110 00000(1111111100011)
 94    1110000011111000001111110 00000(1111111100100)
 95    1110000111110000011110000 000(1111111100101)
 96    1110000000111111111111100 000(1111111100110)
 97    110000000000000000111111111 (1111111100111)
 98    1110000011110000000001111 (1111111101000)
 99    1110000111100000000001111 (1111111101001)
100    1110000000000111100001111 (1111111101010)
101    1111100000000000000001111111 (1111111101011)
102    111000000111111111100001111 (1111111101100)
103    1110000011110000001111111 (1111111101101)
104    11100000011110000011111111111 (1111111101110)
105    1110000000111111111111111110000 (1111111101111)
106    1110000011111111111111110000 (1111111110000)
107    11110000011111111111111100000 (1111111110001)
108    111110000000000000011111 10000(1111111110010)
109    11100000111111111110000011111 (1111111110011)
110    111000001111110000011111111 (1111111110100)
111    1110000011110000011111111 (1111111110101)
112    1111000001111111111000001111 (1111111110110)
113    11110000011111000001111111111 (1111111110111)
114    1111111111000001111100000 1111(1111111111000)
115    11100000001111111111111111000 (1111111111001)
116    1110000111111111111111110000 (1111111111010)
117    1110000111111111111111100000 (1111111111011)
118    11110000001111111111111110000 (1111111111100)
119    11110000011111111111111100000 (1111111111101)
120    111100000000000000001111110000 (1111111111110)
121    11111000000000000000011111 10000(1111111111111)
122    1110000011111111111111111000
123    11100000111111111111111110000
124    111100000011111111111111000
125    1111000001111111111111110000
126    11100000000000000000011111 10000
127    111100000000000000000111110000
128    11110000011111111111111111000
129    1100000000000000000011111 10000
130    11100000000000000000011111 10000
```

FIG. 9

| No. | INPUT | OUTPUT | | | |
|---|---|---|---|---|---|
| | | CODE WORD (CW) | $F_2$ | $E_2$ | I |
| 1 | 01xxxxxxxxx | 11111 | 1 | 1 | 001 |
| 2 | 1000xxxxxxxx | 111110000 | 1 | 0 | 010 |
| 3 | 111000xxxxxx | 111000000000000 | 0 | 1 | 011 |
| 4 | 111100110xxxx | 11110000011110000 | 0 | 0 | 100 |
| 5 | 11110011xxxx | 1111111111100000111 | 1 | 0 | 100 |
| 6 | 11110101 1xx | 1110000111100000011111 | 0 | 1 | 101 |
| 7 | 111111000000xx | 111100000000000000011111 | 1 | 1 | 101 |
| 8 | 11111001010 | 11100000111110000001111110000 | 0 | 0 | 110 |
| 9 | 111111111111 | 11111000000000000000000111110000 | 1 | 0 | 110 |

FIG. 10

| | | | | | | |
|---|---|---|---|---|---|---|
| DATA BIT SEQUENCE | x | 0 | 1111111111111 | 1111000 | 1110011 | 0 |
| CONTENT OF LATCH CIRCUIT 11 | x | α | β | γ | | |
| CW | x | 11111 11111 00000 00000 01111 10000 | 11100 11111 00001 11111 10000 | | | |
| E₂ | x | 0 | 1 | 0 | 1 | |
| E' | x | 1 | 0 | 1 | 0 | |
| F₂ | x | 1 | 1 | 0 | 0 | |
| I | x | 001 | 110 | 010 | 100 | |
| EX OR 17 OUTPUT | x | 00000 11111 00000 00000 01111 10000 | 00011 11110 00001 11111 10000 | | | |
| LB | 0 | 0 | 0 | 0 | 1 | |
| INV₂ | x | 1 | 0 | 1 | 0 | |
| CP | | ← | ← | ← | ← | ← |

FIG. 12

| No. | INPUT | | OUTPUT | |
|---|---|---|---|---|
| | CODE WORD (CW) | DATA WORD (DW) | I | REMARKS |
| 1 | 11111 | 01 | 001 | 3, 6, 12, 13, 19, 31, 46, 48, 51, 53, 59, 66, 67, 76, 78, 89, 101, 108, 114, 121 |
| 2 | 1111110000 | 1000 | 010 | 12, 19, 46, 76 |
| 3 | 1110000000000000 | 111000 | 011 | 27, 57, 60, 64, 86, 100, 126, 130 |
| 4 | 111100000111110000 | 11100110 | 100 | 44, 75 |
| 5 | 1111111111001111 | 11110011 | 100 | 51, 114 |
| 6 | 11100001111000001111 | 11110101111 | 101 | 68, 103 |
| 7 | 1111100000000000001111 | 11111100000 | 101 | 66, 108 |
| 8 | 111000011110000000001001010 | 1111111001010 | 110 | NONE |
| 9 | 1111100000000000000001111110000 | 1111111111110000 | 110 | NONE |

FIG. 13

```
No.   Codes(Data)
 1    111000(00)
 2    111111(01)
 3    11111100000(1000)
 4    1111110000000(1001)
 5    111111110000(1010)
 6    11100000000(1011)
 7    111100000000001111(110000)
 8    111110000000001111(110001)
 9    11111000000000111(110010)
10    1111000000000111(110011)
11    111100000011111(110100)
12    111111000000011111(110101)
13    1111000000111111(110110)
14    111000001111111(110111)
15    111110000001111(111000)
16    1111111000000111(111001)
17    11111100000000001111(11101000)
18    1110000000111111110000(11101001)
19    111100000000111111110000(11101010)
20    1110000000111111110000(11101011)
21    111000000111111110000(11101100)
22    111100000111111110000(11101101)
23    11111000000011111110000(11101110)
24    111111000000111111100000(11101111)
25    11110000000000001111(111110000)
26    11111000000000000111111(111110001)
27    1110000000001111111110000(111110010)
28    111000000011111110000000(111110011)
29    111100000000111111110000(111110100)
30    111100000000011111110000(111110101)
31    1111000000001111111110000000(111110110)
32    111100000011111111110000(111110111)
33    111100000111111111110000(1111000)
34    11111110000001111110000(1111001)
35    111111100000011111110000(1111010)
36    11100000000000001111(1111011)
37    1111000000000000001111(1111100)
38    1111000000000000001111(1111101)
39    1111000000001111110000(1111110)
40    1111000000001111100000(1111111)
41    11110000000111110000000
42    11110000011111100000000
43    1110000000000000111111
44    1110000000000000000111
45    111100000000000000111
46    11111000000000000000111
47    111000000000000000111
48    11100000000000000000111
49    111110000000000000000111
```

FIG. 14

```
No.     Codes(Data)
 1      110(00)
 2      100(01)
 3      111(10)
 4      100001(1100)
 5      111110(1101)
 6      100000(1110)
 7      111000000(111100)
 8      100111111(111101)
 9      100000001(111110)
10      10000111111(11111100)
11      11000000011(11111101)
12      11000000110(11111110)
13      110000000111111(1111111100)
14      111110000000111(1111111101)
15      10000111111000(111111110)
16      100111111000000(111111111)
17      11000000011110
18      111110000000110
19      100001111111001
20      111000000111111
```

FIG. 15

| No. | CODE WORD |
|---|---|
| 1 | 111111000 |
| 2 | 11111001 |
| 3 | 11111100001 |
| 4 | 1111110000011 |
| 5 | 1111110000110 |
| 6 | 1111110000111 |

FIG. 16

| No. | Codes (Data) |
|---|---|
| 1 | 110(00) |
| 2 | 100(01) |
| 3 | 111(10) |
| 4 | 100001(1100) |
| 5 | 111110(1101) |
| 6 | 100000(1110) |
| 7 | 111111000(111100) |
| 8 | 111111001(111101) |
| 9 | 100000001(111110) |
| 10 | 111111000001(11111100) |
| 11 | 111000000011(11111101) |
| 12 | 100111111100(11111110) |
| 13 | 111000000011111(111111100) |
| 14 | 111111000000011(111111101) |
| 15 | 100000111111100(111111110) |
| 16 | 100111111100000(111111111) |
| 17 | 111111000000110 |
| 18 | 111000000011110 |
| 19 | 100111111100001 |
| 20 | 111111000000111 |

FIG. 17

| No. | Codes (Data) |
|---|---|
| 1 | 1100(00) |
| 2 | 1110(01) |
| 3 | 1111(10) |
| 4 | 110001(110) |
| 5 | 111110(111) |

FIG. 18

| | DV | P1 | P2 | LB | F₁ | CODE WORDS | SELECT CODE SC1 | SELECT CODE SC2 |
|---|---|---|---|---|---|---|---|---|
| III.1 | × | — | × | × | 0 | C100i | 0 | 0 |
| III.2 | 0 | 0 | 0 | × | 0 | $\overline{C101i}$ | 0 | — |
| III.2 | 0 | 0 | — | × | 0 | C101i | 0 | 0 |
| III.2 | — | 0 | 0 | × | 0 | C101i | 0 | 0 |
| III.2 | — | 0 | — | × | 0 | $\overline{C101i}$ | 0 | — |
| III.3 | × | — | × | — | — | $\overline{C110i}$ | 0 | — |
| III.3 | × | — | × | 0 | — | C110i | 0 | 0 |
| III.4 | 0 | 0 | 0 | — | — | $\overline{C11mi}$ | 0 | — |
| III.4 | 0 | 0 | — | 0 | — | C11pi | — | 0 |
| III.4 | — | 0 | — | — | — | $\overline{C11mi}$ | — | — |
| III.4 | — | 0 | 0 | 0 | — | C11pi | 0 | 0 |

FIG. 20(a)

| No. | Code words | DP | No. | Code words | DP |
|---|---|---|---|---|---|
| 1 | 100111000 1 | ( 0 ) | 46 | 010011110 0 | ( 0 ) |
| 2 | 011000111 0 | ( 0 ) | 47 | 100001101 1 | ( 0 ) |
| 3 | 100011100 1 | ( 0 ) | 48 | 011110010 0 | ( 0 ) |
| 4 | 011100011 0 | ( 0 ) | 49 | 101001001 1 | ( 0 ) |
| 5 | 101110000 1 | ( 0 ) | 50 | 010110110 0 | ( 0 ) |
| 6 | 010001111 0 | ( 0 ) | 51 | 100101001 1 | ( 0 ) |
| 7 | 100001110 1 | ( 0 ) | 52 | 011010110 0 | ( 0 ) |
| 8 | 011110001 0 | ( 0 ) | 53 | 100100101 1 | ( 0 ) |
| 9 | 101001100 1 | ( 0 ) | 54 | 011011010 0 | ( 0 ) |
| 10 | 010110011 0 | ( 0 ) | 55 | 101010001 1 | ( 0 ) |
| 11 | 100101100 1 | ( 0 ) | 56 | 010101110 0 | ( 0 ) |
| 12 | 011010011 0 | ( 0 ) | 57 | 101000101 1 | ( 0 ) |
| 13 | 100100110 1 | ( 0 ) | 58 | 010111010 0 | ( 0 ) |
| 14 | 011011001 0 | ( 0 ) | 59 | 100010101 1 | ( 0 ) |
| 15 | 101100100 1 | ( 0 ) | 60 | 011101010 0 | ( 0 ) |
| 16 | 010011011 0 | ( 0 ) | 61 | 110011000 1 | ( 0 ) |
| 17 | 100110100 1 | ( 0 ) | 62 | 001100111 0 | ( 0 ) |
| 18 | 011001011 0 | ( 0 ) | 63 | 110001100 1 | ( 0 ) |
| 19 | 100110010 1 | ( 0 ) | 64 | 001110011 0 | ( 0 ) |
| 20 | 011001101 0 | ( 0 ) | 65 | 110110000 1 | ( 0 ) |
| 21 | 101011000 1 | ( 0 ) | 66 | 001001111 0 | ( 0 ) |
| 22 | 010100111 0 | ( 0 ) | 67 | 110000110 1 | ( 0 ) |
| 23 | 101000110 1 | ( 0 ) | 68 | 001111001 0 | ( 0 ) |
| 24 | 010111001 0 | ( 0 ) | 69 | 110100100 1 | ( 0 ) |
| 25 | 100010110 1 | ( 0 ) | 70 | 001011011 0 | ( 0 ) |
| 26 | 011101001 0 | ( 0 ) | 71 | 110010100 1 | ( 0 ) |
| 27 | 101101000 1 | ( 0 ) | 72 | 001101011 0 | ( 0 ) |
| 28 | 010010111 0 | ( 0 ) | 73 | 110010010 1 | ( 0 ) |
| 29 | 101100010 1 | ( 0 ) | 74 | 001101101 0 | ( 0 ) |
| 30 | 010011101 0 | ( 0 ) | 75 | 110101000 1 | ( 0 ) |
| 31 | 100011010 1 | ( 0 ) | 76 | 001010111 0 | ( 0 ) |
| 32 | 011100101 0 | ( 0 ) | 77 | 110100010 1 | ( 0 ) |
| 33 | 101010100 1 | ( 0 ) | 78 | 001011101 0 | ( 0 ) |
| 34 | 010101011 0 | ( 0 ) | 79 | 110001010 1 | ( 0 ) |
| 35 | 101010010 1 | ( 0 ) | 80 | 001110101 0 | ( 0 ) |
| 36 | 010101101 0 | ( 0 ) | 81 | 110010001 1 | ( 0 ) |
| 37 | 101001010 1 | ( 0 ) | 82 | 001101110 0 | ( 0 ) |
| 38 | 010110101 0 | ( 0 ) | 83 | 110001001 1 | ( 0 ) |
| 39 | 100101010 1 | ( 0 ) | 84 | 001110110 0 | ( 0 ) |
| 40 | 011010101 0 | ( 0 ) | 85 | 110100001 1 | ( 0 ) |
| 41 | 100110001 1 | ( 0 ) | 86 | 001011110 0 | ( 0 ) |
| 42 | 011001110 0 | ( 0 ) | 87 | 110000101 1 | ( 0 ) |
| 43 | 100011001 1 | ( 0 ) | 88 | 001111010 0 | ( 0 ) |
| 44 | 011100110 0 | ( 0 ) | 89 | 111001000 1 | ( 0 ) |
| 45 | 101100001 1 | ( 0 ) |  | 000110111 0 | ( 0 ) |

FIG. 20 (b)

| No. | Code words | DP | No. | Code words | DP |
|---|---|---|---|---|---|
| 90 | 1110001001 | (0) | 132 | 0101010101 | (0) |
|  | 0001110110 | (0) | 133 | 1000111100 | (0) |
| 91 | 1110100001 | (0) | 134 | 0111000011 | (0) |
|  | 0001011110 | (0) | 135 | 1011001100 | (0) |
| 92 | 1110000101 | (0) | 136 | 0100110011 | (0) |
|  | 0001111010 | (0) | 137 | 1001101100 | (0) |
| 93 | 1000011110 | (0) | 138 | 0110010011 | (0) |
| 94 | 0111100001 | (0) | 139 | 1010011100 | (0) |
| 95 | 1001100110 | (0) | 140 | 0101100011 | (0) |
| 96 | 0110011001 | (0) | 141 | 1001011100 | (0) |
| 97 | 1011000110 | (0) | 142 | 0110100011 | (0) |
| 98 | 0100111001 | (0) | 143 | 1011100100 | (0) |
| 99 | 1000110110 | (0) | 144 | 0100011011 | (0) |
| 100 | 0111001001 | (0) | 145 | 1001110100 | (0) |
| 101 | 1001001110 | (0) | 146 | 0110001011 | (0) |
| 102 | 0110110001 | (0) | 147 | 1010101100 | (0) |
| 103 | 1001110010 | (0) | 148 | 0101010011 | (0) |
| 104 | 0110001101 | (0) | 149 | 1010110100 | (0) |
| 105 | 1010001110 | (0) | 150 | 0101001011 | (0) |
| 106 | 0101110001 | (0) | 151 | 1011010100 | (0) |
| 107 | 1000101110 | (0) | 152 | 0100101011 | (0) |
| 108 | 0111010001 | (0) | 153 | 1100001110 | (0) |
| 109 | 1011100010 | (0) | 154 | 0011110001 | (0) |
| 110 | 0100011101 | (0) | 155 | 1100100110 | (0) |
| 111 | 1000111010 | (0) | 156 | 0011011001 | (0) |
| 112 | 0111000101 | (0) | 157 | 1100110010 | (0) |
| 113 | 1010100110 | (0) | 158 | 0011001101 | (0) |
| 114 | 0101011001 | (0) | 159 | 1101000110 | (0) |
| 115 | 1010010110 | (0) | 160 | 0010111001 | (0) |
| 116 | 0101101001 | (0) | 161 | 1100010110 | (0) |
| 117 | 1001010110 | (0) | 162 | 0011101001 | (0) |
| 118 | 0110101001 | (0) | 163 | 1101100010 | (0) |
| 119 | 1010110010 | (0) | 164 | 0010011101 | (-0) |
| 120 | 0101001101 | (0) | 165 | 1100011010 | (0) |
| 121 | 1010011010 | (0) | 166 | 0011100101 | (0) |
| 122 | 0101100101 | (0) | 167 | 1101010010 | (0) |
| 123 | 1001011010 | (0) | 168 | 0010101101 | (0) |
| 124 | 0110100101 | (0) | 169 | 1101001010 | (0) |
| 125 | 1011010010 | (0) | 170 | 0010110101 | (0) |
| 126 | 0100101101 | (0) | 171 | 1100101010 | (0) |
| 127 | 1011001010 | (0) | 172 | 0011010101 | (0) |
| 128 | 0100110101 | (0) | 173 | 1100011100 | (0) |
| 129 | 1001101010 | (0) | 174 | 0011100011 | (0) |
| 130 | 0110010101 | (0) | 175 | 1101001100 | (0) |
| 131 | 1010101010 | (0) | 176 | 0010110011 | (0) |

FIG. 20(c)

| No. | Code words | DP | No. | Code words | DP |
|---|---|---|---|---|---|
| 177 | 110010110 0 | ( 0 ) | 204 | 101000010 1 | (-2) |
|  |  |  |  | 010111101 0 | ( 2 ) |
| 178 | 001101001 1 | ( 0 ) | 205 | 100001010 1 | (-2) |
|  |  |  |  | 011110101 0 | ( 2 ) |
| 179 | 110110010 0 | ( 0 ) | 206 | 100010001 1 | (-2) |
| 180 | 001001101 1 | ( 0 ) |  | 011101110 0 | ( 2 ) |
| 181 | 110011010 0 | ( 0 ) | 207 | 100100001 1 | (-2) |
| 182 | 001100101 1 | ( 0 ) |  | 011011110 0 | ( 2 ) |
| 183 | 110101010 0 | ( 0 ) | 208 | 100001001 1 | (-2) |
| 184 | 001010101 1 | ( 0 ) |  | 011110110 0 | ( 2 ) |
| 185 | 111000011 0 | ( 0 ) | 209 | 110001000 1 | (-2) |
|  | 000111100 1 | ( 0 ) |  | 001110111 0 | ( 2 ) |
| 186 | 111001001 0 | ( 0 ) | 210 | 110110000 1 | (-2) |
|  | 000110110 1 | ( 0 ) |  | 001101111 0 | ( 2 ) |
| 187 | 111010001 0 | ( 0 ) | 211 | 110000100 1 | (-2) |
|  | 000101110 1 | ( 0 ) |  | 001111011 0 | ( 2 ) |
| 188 | 111000101 0 | ( 0 ) | 212 | 100100011 0 | (-2) |
|  | 000111010 1 | ( 0 ) |  | 011011100 1 | (-2) |
| 189 | 111000110 0 | ( 0 ) | 213 | 100010011 0 | (-2) |
|  | 000111001 1 | ( 0 ) |  | 011101100 1 | ( 2 ) |
| 190 | 111010010 0 | ( 0 ) | 214 | 100110001 0 | (-2) |
|  | 000101101 1 | ( 0 ) |  | 011001110 1 | ( 2 ) |
| 191 | 111001010 0 | ( 0 ) | 215 | 100011001 0 | (-2) |
|  | 000110101 1 | ( 0 ) |  | 011100110 1 | ( 2 ) |
| 192 | 111100001 0 | ( 0 ) | 216 | 101000011 0 | (-2) |
|  | 000011110 1 | ( 0 ) |  | 010111100 1 | ( 2 ) |
| 193 | 111100010 0 | ( 0 ) | 217 | 100001011 0 | (-2) |
|  | 000011101 1 | ( 0 ) |  | 011110100 1 | ( 2 ) |
| 194 | 100110000 1 | (-2) | 218 | 101100001 0 | (-2) |
|  | 011001111 0 | ( 2 ) |  | 010011110 1 | ( 2 ) |
| 195 | 100001100 1 | (-2) | 219 | 100001101 0 | (-2) |
|  | 011110011 0 | ( 2 ) |  | 011110010 1 | ( 2 ) |
| 196 | 100100100 1 | (-2) | 220 | 101001001 0 | (-2) |
|  | 011011011 0 | ( 2 ) |  | 010110110 1 | ( 2 ) |
| 197 | 101001000 1 | (-2) | 221 | 100101001 0 | (-2) |
|  | 010110111 0 | ( 2 ) |  | 011010110 1 | ( 2 ) |
| 198 | 101000100 1 | (-2) | 222 | 100100101 0 | (-2) |
|  | 010111011 0 | ( 2 ) |  | 011011010 1 | ( 2 ) |
| 199 | 100101000 1 | (-2) | 223 | 101010001 0 | (-2) |
|  | 011010111 0 | ( 2 ) |  | 010101110 1 | ( 2 ) |
| 200 | 100100010 1 | (-2) | 224 | 101000101 0 | (-2) |
|  | 011011101 0 | ( 2 ) |  | 010111010 1 | ( 2 ) |
| 201 | 100010100 1 | (-2) | 225 | 100010101 0 | (-2) |
|  | 011101011 0 | ( 2 ) |  | 011101010 1 | ( 2 ) |
| 202 | 100010010 1 | (-2) | 226 | 100001110 0 | (-2) |
|  | 011101101 0 | ( 2 ) |  | 011110001 1 | ( 2 ) |
| 203 | 101010000 1 | (-2) |  |  |  |
|  | 010101111 0 | ( 2 ) |  |  |  |

FIG. 20 (d)

| No. | Code words | DP | No. | Code words | DP |
|---|---|---|---|---|---|
| 227 | 100100110001101100 11 | (-2)( 2) | 250 | 100010010001110110 11 | (-4)( 4) |
| 228 | 100110010001100110 11 | (-2)( 2) | 251 | 101000010001011110 11 | (-4)( 4) |
| 229 | 101000110001011100 11 | (-2)( 2) | 252 | 100001010001111010 11 | (-4)( 4) |
| 230 | 100010110001110100 11 | (-2)( 2) | 253 | 100011000101110011 10 | (-2)( 2) |
| 231 | 101100010001001110 11 | (-2)( 2) | 254 | 100111100101100001 10 | ( 2)(-2) |
| 232 | 100011010001110010 11 | (-2)( 2) | 255 | 101111000101000011 10 | ( 2)(-2) |
| 233 | 101010010001010110 11 | (-2)( 2) | 256 | 100111110101100000 10 | ( 2)(-2) |
| 234 | 101001010001011010 11 | (-2)( 2) | 257 | 101101100101000100 10 | ( 2)(-2) |
| 235 | 100101010001101010 11 | (-2)( 2) | 258 | 101100110101001100 10 | ( 2)(-2) |
| 236 | 110010001000110111 01 | (-2)( 2) | 259 | 100110110101100100 10 | ( 2)(-2) |
| 237 | 110001001000111011 01 | (-2)( 2) | 260 | 101011100101010001 10 | ( 2)(-2) |
| 238 | 110100001000101111 01 | (-2)( 2) | 261 | 101001110101011000 10 | ( 2)(-2) |
| 239 | 110000101000111101 01 | (-2)( 2) | 262 | 100101110101101000 10 | ( 2)(-2) |
| 240 | 110000110000111100 11 | (-2)( 2) | 263 | 101110100101000011 10 | ( 2)(-2) |
| 241 | 110010010000110110 11 | (-2)( 2) | 264 | 101110010101000110 10 | ( 2)(-2) |
| 242 | 110100010000101111 01 | (-2)( 2) | 265 | 100111010101100010 10 | ( 2)(-2) |
| 243 | 110001010000111010 11 | (-2)( 2) | 266 | 101010110101010010 10 | ( 2)(-2) |
| 244 | 100010000101101111 10 | (-4)( 4) | 267 | 101011010101001010 10 | ( 2)(-2) |
| 245 | 100001000101111011 10 | (-4)( 4) | 268 | 101101010101001010 10 | ( 2)(-2) |
| 246 | 100010001001110111 01 | (-4)( 4) | 269 | 100111001101100011 00 | ( 2)(-2) |
| 247 | 100100001001101111 01 | (-4)( 4) | 270 | 101110001101000111 00 | ( 2)(-2) |
| 248 | 100001001001111011 01 | (-4)( 4) | 271 | 100011011101111000 00 | ( 2)(-2) |
| 249 | 100100010001101110 11 | (-4)( 4) | 272 | 101011001101010011 00 | ( 2)(-2) |

FIG. 20(e)

| No. | Code words | DP | No. | Code words | DP |
|---|---|---|---|---|---|
| 273 | 1010011011<br>0101100100 | ( 2)<br>(-2) | 296 | 1001101110<br>0110010001 | (-2)<br>( 2) |
| 274 | 1001011011<br>0110100100 | ( 2)<br>(-2) | 297 | 1011100110<br>0100011001 | (-2)<br>( 2) |
| 275 | 1011010011<br>0100101100 | ( 2)<br>(-2) | 298 | 1001110110<br>0110001001 | (-2)<br>( 2) |
| 276 | 1011001011<br>0100110100 | ( 2)<br>(-2) | 299 | 1010011110<br>0101100001 | (-2)<br>( 2) |
| 277 | 1001101011<br>0110010100 | ( 2)<br>(-2) | 300 | 1001011110<br>0110100001 | (-2)<br>( 2) |
| 278 | 1010101011<br>0101010100 | ( 2)<br>(-2) | 301 | 1011110010<br>0100001101 | (-2)<br>( 2) |
| 279 | 1100111001<br>0011000110 | ( 2)<br>(-2) | 302 | 1001111010<br>0110000101 | (-2)<br>( 2) |
| 280 | 1101110001<br>0010001110 | ( 2)<br>(-2) | 303 | 1010110110<br>0101001001 | (-2)<br>( 2) |
| 281 | 1100011101<br>0011100010 | ( 2)<br>(-2) | 304 | 1011010110<br>0100101001 | (-2)<br>( 2) |
| 282 | 1101011001<br>0010100110 | ( 2)<br>(-2) | 305 | 1011011010<br>0100100101 | (-2)<br>( 2) |
| 283 | 1101001101<br>0010110010 | ( 2)<br>(-2) | 306 | 1010101110<br>0101010001 | (-2)<br>( 2) |
| 284 | 1100101101<br>0011010010 | ( 2)<br>(-2) | 307 | 1010111010<br>0101000101 | (-2)<br>( 2) |
| 285 | 1101101001<br>0010010110 | ( 2)<br>(-2) | 308 | 1011101010<br>0100010101 | (-2)<br>( 2) |
| 286 | 1101100101<br>0010011010 | ( 2)<br>(-2) | 309 | 1011011100<br>0100100011 | (-2)<br>( 2) |
| 287 | 1100110101<br>0011001010 | ( 2)<br>(-2) | 310 | 1011101100<br>0100010011 | (-2)<br>( 2) |
| 288 | 1101010101<br>0010101010 | ( 2)<br>(-2) | 311 | 1010111100<br>0101000011 | (-2)<br>( 2) |
| 289 | 1100110011<br>0011001100 | ( 2)<br>(-2) | 312 | 1011110100<br>0100001011 | (-2)<br>( 2) |
| 290 | 1101100011<br>0010011100 | ( 2)<br>(-2) | 313 | 1100011110<br>0011100001 | (-2)<br>( 2) |
| 291 | 1100011011<br>0011100100 | ( 2)<br>(-2) | 314 | 1101100110<br>0010011001 | (-2)<br>( 2) |
| 292 | 1101010011<br>0010101100 | ( 2)<br>(-2) | 315 | 1100110110<br>0011001001 | (-2)<br>( 2) |
| 293 | 1101001011<br>0010110100 | ( 2)<br>(-2) | 316 | 1101001110<br>0010110001 | (-2)<br>( 2) |
| 294 | 1100101011<br>0011010100 | ( 2)<br>(-2) | 317 | 1100101110<br>0011010001 | (-2)<br>( 2) |
| 295 | 1011001110<br>0100110001 | ( 2)<br>(-2) | 318 | 0010001101 | (-2) |

FIG. 20(f)

| No. | Code words | DP | No. | Code words | DP |
|---|---|---|---|---|---|
| 319 | 1100111010<br>0011000101 | ( 2)<br>(-2) | 342 | 1100111011<br>0011000100 | ( 4)<br>(-4) |
| 320 | 1101010110<br>0010101001 | ( 2)<br>(-2) | 343 | 1101011011<br>0010100100 | ( 4)<br>(-4) |
| 321 | 1101011010<br>0010100101 | ( 2)<br>(-2) | 344 | 1101101011<br>0010010100 | ( 4)<br>(-4) |
| 322 | 1101101010<br>0010010101 | ( 2)<br>(-2) | 345 | 1011101110<br>0100010001 | ( 4)<br>(-4) |
| 323 | 1100111100<br>0011000011 | ( 2)<br>(-2) | 346 | 1011011110<br>0100100001 | ( 4)<br>(-4) |
| 324 | 1101101100<br>0010010011 | ( 2)<br>(-2) | 347 | 1011110110<br>0100001001 | ( 4)<br>(-4) |
| 325 | 1101011100<br>0010100011 | ( 2)<br>(-2) | 348 | 1101101110<br>0010010001 | ( 4)<br>(-4) |
| 326 | 1101110100<br>0010001011 | ( 2)<br>(-2) | 349 | 1101110110<br>0010001001 | ( 4)<br>(-4) |
| 327 | 1011011101<br>0100100010 | ( 4)<br>(-4) | 350 | 1101011110<br>0010100001 | ( 4)<br>(-4) |
| 328 | 1011101101<br>0100010010 | ( 4)<br>(-4) | 351 | 1101111010<br>0010000101 | ( 4)<br>(-4) |
| 329 | 1010111101<br>0101000010 | ( 4)<br>(-4) | 352 | 1101111011<br>0010000100 | ( 6)<br>(-6) |
| 330 | 1011110101<br>0100001010 | ( 4)<br>(-4) | 353 | 1111010100<br>0000101011<br>1110000100<br>0001111011 | ( 2)<br>(-2)<br>(-2)<br>( 2) |
| 331 | 1011111001<br>0100000110 | ( 4)<br>(-4) | | | |
| 332 | 1001111011<br>0110000100 | ( 4)<br>(-4) | | | |
| 333 | 1011011011<br>0100100100 | ( 4)<br>(-4) | | | |
| 334 | 1010111011<br>0101000100 | ( 4)<br>(-4) | | | |
| 335 | 1011101011<br>0100010100 | ( 4)<br>(-4) | | | |
| 336 | 1101111001<br>0010000110 | ( 4)<br>(-4) | | | |
| 337 | 1100111101<br>0011000010 | ( 4)<br>(-4) | | | |
| 338 | 1101101101<br>0010010010 | ( 4)<br>(-4) | | | |
| 339 | 1101011101<br>0010100010 | ( 4)<br>(-4) | | | |
| 340 | 1101110101<br>0010001010 | ( 4)<br>(-4) | | | |
| 341 | 1101110011<br>0010001100 | ( 4)<br>(-4) | | | |

FIG. 21

| |DP| | | $F_1$ | NUMBER OF CODE WORDS |
|---|---|---|---|
| 0 | | 0 | 240 |
| | | 1 | 5 |
| ≠ 0 | ≤ 4 | 0 | 280 |
| | > 4 | 0 | 19 |

FIG. 22

| |DP| | | $F_1$ | NUMBER OF CODE WORDS |
|---|---|---|---|
| 0 | | 0 | 68 |
| | | 1 | 0 |
| ≠ 0 | ≤ 4 | 0 | 64 |
| | > 4 | 0 | 0 |

FIG. 25

|  | DV | P | E₂ | LB | F₂ | CODE WORD | SELECT CODE ||
|---|---|---|---|---|---|---|---|---|
|  |  |  |  |  |  |  | SC1 | SC2 |
| IV.1 | X | 0 | X | 1 | 0 | C200i | 0 | 0 |
| IV.1 | X | 0 | X | 0 | 0 | $\overline{C200i}$ | 0 | 1 |
| IV.2 | X | 0 | 1 | 1 | 1 | $\overline{C210i}$ | 0 | 1 |
| IV.2 | X | 0 | 0 | 1 | 1 | C210i | 0 | 0 |
| IV.2 | X | 0 | 1 | 0 | 1 | C210i | 0 | 0 |
| IV.2 | X | 0 | 0 | 0 | 1 | $\overline{C210i}$ | 0 | 1 |
| IV.3 | 0 | 1 | X | 1 | 0 | C20mi | 1 | 0 |
| IV.3 | 0 | 1 | X | 0 | 0 | $\overline{C20pi}$ | 0 | 1 |
| IV.3 | 1 | 1 | X | 1 | 0 | C20pi | 0 | 0 |
| IV.3 | 1 | 1 | X | 0 | 0 | $\overline{C20mi}$ | 1 | 1 |
| IV.4 | 0 | 1 | 1 | 1 | 1 | $\overline{C21pi}$ | 0 | 1 |
| IV.4 | 0 | 1 | 0 | 1 | 1 | C21mi | 1 | 0 |
| IV.4 | 0 | 1 | 1 | 0 | 1 | C21mi | 1 | 0 |
| IV.4 | 0 | 1 | 0 | 0 | 1 | $\overline{C21pi}$ | 0 | 1 |
| IV.4 | 1 | 1 | 1 | 1 | 1 | $\overline{C21mi}$ | 1 | 1 |
| IV.4 | 1 | 1 | 0 | 1 | 1 | C21pi | 0 | 0 |
| IV.4 | 1 | 1 | 1 | 0 | 1 | C21pi | 0 | 0 |
| IV.4 | 1 | 1 | 0 | 0 | 1 | C21mi | 1 | 1 |

FIG. 26(a)

| No. | Code words | DP | No. | Code words | DP |
|---|---|---|---|---|---|
| 1 | 100011111100111 | (0) | 24 | 100110000011111 | (0) |
|   | 011100000111110 | (0) |    | 011001111110000 | (0) |
| 2 | 100001111110001 | (0) | 25 | 100000110011111 | (0) |
|   | 011110000011110 | (0) |    | 011111100110000 | (0) |
| 3 | 100111111000001 | (0) | 26 | 100000000111111 | (0) |
|   | 011000000111110 | (0) |    | 011111111000000 | (0) |
| 4 | 100000111111001 | (0) | 27 | 110001111100001 | (0) |
|   | 011111100000110 | (0) |    | 001110000011110 | (0) |
| 5 | 100110011110001 | (0) | 28 | 110000111110001 | (0) |
|   | 011001100001110 | (0) |    | 001111100001110 | (0) |
| 6 | 100110001111001 | (0) | 29 | 110011111000001 | (0) |
|   | 011001110000110 | (0) |    | 001100000111110 | (0) |
| 7 | 100011001111001 | (0) | 30 | 110000011111001 | (0) |
|   | 011100110000110 | (0) |    | 001111110000110 | (0) |
| 8 | 100111100110001 | (0) | 31 | 110011001100001 | (0) |
|   | 011000011001110 | (0) |    | 001100110011110 | (0) |
| 9 | 100111000011001 | (0) | 32 | 110011000011001 | (0) |
|   | 011000111100110 | (0) |    | 001100111100110 | (0) |
| 10 | 100011100011001 | (0) | 33 | 110001100011001 | (0) |
|   | 011100011100110 | (0) |    | 001110011100110 | (0) |
| 11 | 100011110000011 | (0) | 34 | 110001110000011 | (0) |
|   | 011100001111100 | (0) |    | 001110001111100 | (0) |
| 12 | 100001111100011 | (0) | 35 | 110000111100011 | (0) |
|   | 011110000011100 | (0) |    | 001111000011100 | (0) |
| 13 | 100111100000011 | (0) | 36 | 110011110000011 | (0) |
|   | 011000011111100 | (0) |    | 001100001111100 | (0) |
| 14 | 100000111110011 | (0) | 37 | 110000011110011 | (0) |
|   | 011111000001100 | (0) |    | 001111100001100 | (0) |
| 15 | 100110011100011 | (0) | 38 | 110001100001111 | (0) |
|   | 011001100011100 | (0) |    | 001110011111000 | (0) |
| 16 | 100100011001111 | (0) | 39 | 110000110001111 | (0) |
|   | 011001110011000 | (0) |    | 001111001110000 | (0) |
| 17 | 100011001100111 | (0) | 40 | 110011000001111 | (0) |
|   | 011100110011000 | (0) |    | 001100111110000 | (0) |
| 18 | 100011110000111 | (0) | 41 | 110000011001111 | (0) |
|   | 011100001111000 | (0) |    | 001111100110000 | (0) |
| 19 | 100001111000111 | (0) | 42 | 110000000111111 | (0) |
|   | 011110000111000 | (0) |    | 001111111000000 | (0) |
| 20 | 100111000000111 | (0) | 43 | 111000011100001 | (0) |
|   | 011000111111000 | (0) |    | 000111100011110 | (0) |
| 21 | 100000111100111 | (0) | 44 | 111000001110001 | (0) |
|   | 011111000011000 | (0) |    | 000111110001110 | (0) |
| 22 | 100011000011111 | (0) | 45 | 111001110000001 | (0) |
|   | 011100111110000 | (0) |    | 000110001111110 | (0) |
| 23 | 100001100011111 | (0) | 46 | 111000000111001 | (0) |
|   | 011110011110000 | (0) |    | 000111111000110 | (0) |

FIG. 26(b)

| No. | Code words | DP | No. | Code words | DP |
|---|---|---|---|---|---|
| 47 | 1110001100011 | (0) | 70 | 100000111111100 | (0) |
|    | 0001110011100 | (0) |    | 011111000000011 | (0) |
| 48 | 1110000110011 | (0) | 71 | 100111000111100 | (0) |
|    | 0001111001100 | (0) |    | 011000111000011 | (0) |
| 49 | 1110011000011 | (0) | 72 | 100011100111100 | (0) |
|    | 0001100111100 | (0) |    | 011100011000011 | (0) |
| 50 | 1110000011001 | (0) | 73 | 100110001111100 | (0) |
|    | 0001111100110 | (0) |    | 011001110000011 | (0) |
| 51 | 1110000001111 | (0) | 74 | 100011001111100 | (0) |
|    | 0001111110000 | (0) |    | 011100110000011 | (0) |
| 52 | 1111000110000 1 | (0) | 75 | 100111100001100 | (0) |
|    | 00001100111110 | (0) |    | 011000011110011 | (0) |
| 53 | 1111000011000 1 | (0) | 76 | 100011110011100 | (0) |
|    | 0000111100110 | (0) |    | 011100001100011 | (0) |
| 54 | 1111001100000 1 | (0) | 77 | 100001111111000 | (0) |
|    | 0000110011110 | (0) |    | 011110000000111 | (0) |
| 55 | 1111000000110 01 | (0) | 78 | 100111001111000 | (0) |
|    | 0000111100110 | (0) |    | 011000110000111 | (0) |
| 56 | 1111000000111 | (0) | 79 | 100110011111000 | (0) |
|    | 00001111111000 | (0) |    | 011001100001111 | (0) |
| 57 | 1111100000011 | (0) | 80 | 100111100111000 | (0) |
|    | 0000011111100 | (0) |    | 011000011000111 | (0) |
| 58 | 1111110000001 | (0) | 81 | 100011111100000 | (0) |
|    | 0000001111110 | (0) |    | 011100000001111 | (0) |
| 59 | 1000000111110 | (0) | 82 | 100111111100000 | (0) |
|    | 0111111000001 | (0) |    | 011000000011111 | (0) |
| 60 | 1000111001110 | (0) | 83 | 110000001111110 | (0) |
|    | 0111000110001 | (0) |    | 001111110000001 | (0) |
| 61 | 1001110001110 | (0) | 84 | 1100011000110 | (0) |
|    | 0110001110001 | (0) |    | 0011100111001 | (0) |
| 62 | 1000111001110 | (0) | 85 | 110001110001110 | (0) |
|    | 0111100011001 | (0) |    | 001110001111001 | (0) |
| 63 | 1000110001110 | (0) | 86 | 110011000011110 | (0) |
|    | 0111100110001 | (0) |    | 001100111100001 | (0) |
| 64 | 1000111100011 10 | (0) | 87 | 110000110011 10 | (0) |
|    | 0111000011001 | (0) |    | 001111001100001 | (0) |
| 65 | 1001100001110 | (0) | 88 | 110011100001110 | (0) |
|    | 0110011110001 | (0) |    | 001100011110001 | (0) |
| 66 | 1000011001110 | (0) | 89 | 110000111001110 | (0) |
|    | 0111100110001 | (0) |    | 001111000110001 | (0) |
| 67 | 1001111000011 10 | (0) | 90 | 110000011111100 | (0) |
|    | 011000011110 01 | (0) |    | 001111100000011 | (0) |
| 68 | 1000011100110 | (0) | 91 | 110011000111100 | (0) |
|    | 0111100011001 | (0) |    | 001100111000011 | (0) |
| 69 | 1001100110011 0 | (0) | 92 | 110001100111100 | (0) |
|    | 0110011001100 | (0) |    | 001110011000011 | (0) |

FIG. 26(c)

| No. | Code words | DP | No. | Code words | DP |
|---|---|---|---|---|---|
| 93 | 110011 1 0001100 | (0) | 116 | 111 11000000110 | (0) |
|  | 001 1 0001 1 1 0011 | (0) |  | 00000111111001 | (0) |
| 94 | 110001 1 1 001100 | (0) | 117 | 11111 000001100 | (0) |
|  | 00111000110011 | (0) |  | 00000111110011 | (0) |
| 95 | 11000011111000 | (0) | 118 | 11111000011000 | (0) |
|  | 00111100000111 | (0) |  | 00000111100111 | (0) |
| 96 | 11001100111000 | (0) | 119 | 11111000110000 | (0) |
|  | 00110011000111 | (0) |  | 00000111001111 | (0) |
| 97 | 11001 10011000 | (0) | 120 | 11111001100000 | (0) |
|  | 00110001100111 | (0) |  | 00000110011111 | (0) |
| 98 | 11000111110000 | (0) | 121 | 11111110000000 | (0) |
|  | 00111000001111 | (0) |  | 00000001111111 | (0) |
| 99 | 11001111100000 | (0) | 122 | 10011100000110 | (-2) |
|  | 00110000011111 | (0) |  | 01100011111001 | (2) |
| 100 | 11100000011110 | (0) |  | 10001111110001 | (2) |
|  | 00011111100001 | (0) |  | 01110000001110 | (-2) |
| 101 | 11100011000110 | (0) | 123 | 10000001111100 | (-2) |
|  | 00011100111001 | (0) |  | 01111110000011 | (2) |
| 102 | 11100110000110 | (0) |  | 10011111110001 | (2) |
|  | 00011001111001 | (0) |  | 01100000011110 | (-2) |
| 103 | 11100001100110 | (0) | 124 | 10001110001100 | (-2) |
|  | 00011110011001 | (0) |  | 01110001110011 | (2) |
| 104 | 11100000111100 | (0) |  | 10000111111001 | (2) |
|  | 00011111000011 | (0) |  | 01111000000110 | (-2) |
| 105 | 11100110001100 | (0) | 125 | 10000110011100 | (-2) |
|  | 00011001110011 | (0) |  | 01111001100011 | (2) |
| 106 | 11100011001100 | (0) |  | 10011100110001 | (2) |
|  | 00011100110011 | (0) |  | 01100011000110 | (-2) |
| 107 | 11100001111000 | (0) | 126 | 10000111001100 | (-2) |
|  | 00011110000111 | (0) |  | 01111000110011 | (2) |
| 108 | 11100110011000 | (0) |  | 10011001111001 | (2) |
|  | 00011001100111 | (0) |  | 01100110000110 | (-2) |
| 109 | 11100011110000 | (0) | 127 | 10011000111000 | (-2) |
|  | 00011100001111 | (0) |  | 01100111000111 | (2) |
| 110 | 11100111100000 | (0) |  | 10011110011001 | (2) |
|  | 00011000011111 | (0) |  | 01100001100110 | (-2) |
| 111 | 11110000001110 | (0) | 128 | 10011100011000 | (-2) |
|  | 00001111110001 | (0) |  | 01100011100111 | (2) |
| 112 | 11110000011100 | (0) |  | 10001111100011 | (2) |
|  | 00001111100011 | (0) |  | 01110000011100 | (-2) |
| 113 | 11110000111000 | (0) | 129 | 10000111110000 | (-2) |
|  | 00001111000111 | (0) |  | 01111000001111 | (2) |
| 114 | 11110001110000 | (0) |  | 10011111000011 | (2) |
|  | 00001110001111 | (0) |  | 01100000111100 | (-2) |
| 115 | 11110011100000 | (0) | 130 | 10011100110000 | (-2) |
|  | 00001100011111 | (0) |  | 01100011001111 | (2) |
|  |  |  |  | 10000111110011 | (2) |
|  |  |  |  | 01111000001100 | (-2) |

FIG. 26(d)

| No. | Code words | DP | No. | Code words | DP |
|---|---|---|---|---|---|
| 131 | 100111111000000 | (-2) | 143 | 111110000001100 | (-2) |
|  | 011000000111111 | ( 2) |  | 000011111110011 | ( 2) |
|  | 100110011110011 | ( 2) |  | 110000111100111 | ( 2) |
|  | 011001100001100 | (-2) |  | 001111000011000 | (-2) |
| 132 | 110001100000110 | (-2) | 144 | 111110000110000 | (-2) |
|  | 001110011111001 | ( 2) |  | 000011111001111 | ( 2) |
|  | 110001111110001 | ( 2) |  | 110001100011111 | ( 2) |
|  | 001110000001110 | (-2) |  | 001110011110000 | (-2) |
| 133 | 110011000000110 | (-2) | 145 | 111100110000000 | (-2) |
|  | 001100111111001 | ( 2) |  | 000011001111111 | ( 2) |
|  | 110011111100001 | ( 2) |  | 110011000011111 | ( 2) |
|  | 001100000111110 | (-2) |  | 001100111100000 | (-2) |
| 134 | 110000001111100 | (-2) | 146 | 100001100000001 | (-6) |
|  | 001111110000011 | ( 2) |  | 011110011111110 | ( 6) |
|  | 110000111111001 | (-2) |  | 100110011001111 | ( 2) |
|  | 001111000000110 | ( 2) |  | 011001100110000 | (-2) |
| 135 | 110011000001100 | ( 2) | 147 | 100011000000001 | (-6) |
|  | 001100111110011 | (-2) |  | 011100111111110 | ( 6) |
|  | 110011001111001 | (-2) |  | 100011110001111 | ( 2) |
|  | 001100110000110 | ( 2) |  | 011100001110000 | (-2) |
| 136 | 110000011110000 | (-2) | 148 | 100110000000001 | (-6) |
|  | 001111100000111 | (-2) |  | 011001111111110 | ( 6) |
|  | 110011100110001 | ( 2) |  | 100111100001111 | ( 2) |
|  | 001100011001110 | (-2) |  | 011000011110000 | (-2) |
| 137 | 110001100110000 | (-2) | 149 | 100000001111100 | (-6) |
|  | 001110011001111 | ( 2) |  | 011111110000011 | ( 6) |
|  | 110001111000111 | (-2) |  | 100001111001111 | ( 2) |
|  | 001110000111100 | (-2) |  | 011110000110000 | (-2) |
| 138 | 110011001100000 | ( 2) | 150 | 100000001110000 | (-6) |
|  | 001100110011111 | (-2) |  | 011111110001111 | ( 6) |
|  | 110011110000111 | (-2) |  | 100110011001111 | ( 2) |
|  | 001100001111100 | ( 2) |  | 011001100110000 | (-2) |
| 139 | 110011110000000 | (-2) | 151 | 100001110000000 | (-6) |
|  | 001100001111111 | (-2) |  | 011110001111111 | ( 6) |
|  | 110000111110011 | ( 2) |  | 100011100001111 | ( 2) |
|  | 001111000001100 | (-2) |  | 011100011110000 | (-2) |
| 140 | 111000000111100 | (-2) | 152 | 110000000011100 | (-6) |
|  | 000111111000011 | ( 2) |  | 001111111100011 | ( 6) |
|  | 110011001100011 | (-2) |  | 110000110011111 | ( 2) |
|  | 001100110011100 | (-2) |  | 001111001100000 | (-2) |
| 141 | 111000011110000 | ( 2) | 153 | 110000001100000 | (-6) |
|  | 000111100001111 | (-2) |  | 001111110011111 | ( 6) |
|  | 110001110001111 | (-2) |  | 110000000111111 | ( 2) |
|  | 001110001110000 | ( 2) |  | 001111111000000 | (-2) |
| 142 | 111001111000000 | (-2) | 154 | 110000011000000 | (-6) |
|  | 000110001111111 | (-2) |  | 001111100111111 | ( 6) |
|  | 110011100001111 | ( 2) |  | 111000111100001 | ( 2) |
|  | 001100011110000 | (-2) |  | 000111000011110 | (-2) |

FIG. 26(e)

| No. | Code words | DP | No. | Code words | DP |
|---|---|---|---|---|---|
| 155 | 1000011100000 1 | (−4) | 167 | 100000001 11100 | (−4) |
|  | 0111100011 1110 | ( 4) |  | 0111111100001 1 | ( 4) |
|  | 1001100001111 | ( 2) |  | 100111 10001 110 | ( 2) |
|  | 0110001111 0000 | (−2) |  | 0110000111 0001 | (−2) |
| 156 | 10001110000001 | (−4) | 168 | 1000011000 1100 | (−4) |
|  | 01110001111110 | ( 4) |  | 01111001100 11 | ( 4) |
|  | 10000111001111 | ( 2) |  | 100011110011 10 | ( 2) |
|  | 01111000110000 | (−2) |  | 0111000011 0001 | (−2) |
| 157 | 10011100000001 | (−4) | 169 | 10000011001100 | (−4) |
|  | 01100011111110 | ( 4) |  | 01111100110011 | ( 4) |
|  | 10001100011111 | ( 2) |  | 10011000111110 | ( 2) |
|  | 01110011100000 | (−2) |  | 01100111000001 | (−2) |
| 158 | 1000011000001 1 | (−4) | 170 | 10001100011000 | (−4) |
|  | 0111100111 1100 | ( 4) |  | 01110011100111 | ( 4) |
|  | 10011000011111 | ( 2) |  | 10001100111110 | ( 2) |
|  | 01100111100000 | (−2) |  | 01110011000001 | (−2) |
| 159 | 10001100000011 | (−4) | 171 | 10000110011000 | (−4) |
|  | 01110011111100 | ( 4) |  | 01111001100111 | ( 4) |
|  | 10000110011111 | ( 2) |  | 10011111000110 | ( 2) |
|  | 01111001100000 | (−2) |  | 01100000111001 | (−2) |
| 160 | 10011000000011 | (−4) | 172 | 10011000110000 | (−4) |
|  | 01100111111100 | ( 4) |  | 01100111001111 | ( 4) |
|  | 10000001111111 | ( 2) |  | 10001111100110 | ( 2) |
|  | 01111110000000 | (−2) |  | 01110000011001 | (−2) |
| 161 | 11000011000001 | (−4) | 173 | 10000111000000 | (−4) |
|  | 00111100111110 | ( 4) |  | 01111000011111 | ( 4) |
|  | 11100111100001 | ( 2) |  | 10000111111100 | ( 2) |
|  | 00011000011110 | (−2) |  | 01111000000011 | (−2) |
| 162 | 11000110000001 | (−4) | 174 | 10001111000000 | (−4) |
|  | 00111001111110 | ( 4) |  | 01110000111111 | ( 4) |
|  | 11100001111001 | ( 2) |  | 10011100111100 | ( 2) |
|  | 00011110000110 | (−2) |  | 01100011000011 | (−2) |
| 163 | 11001100000001 | (−4) | 175 | 11000000001110 | (−4) |
|  | 00110011111110 | ( 4) |  | 00111111110001 | ( 4) |
|  | 11100110011001 | ( 2) |  | 11100011100011 | ( 2) |
|  | 00011001100110 | (−2) |  | 00011100011100 | (−2) |
| 164 | 10000000011110 | (−4) | 176 | 11000000111000 | (−4) |
|  | 01111111100001 | ( 4) |  | 00111111000111 | ( 4) |
|  | 10000011111110 | ( 2) |  | 11100111000011 | ( 2) |
|  | 01111100000001 | (−2) |  | 00011000111100 | (−2) |
| 165 | 10001100000110 | (−4) | 177 | 11000011100000 | (−4) |
|  | 01110011111001 | ( 4) |  | 00111100011111 | ( 4) |
|  | 10011100011110 | ( 2) |  | 11100001110011 | ( 2) |
|  | 01100011100001 | (−2) |  | 00011110001100 | (−2) |
| 166 | 10011000000110 | (−4) | 178 | 11001110000000 | (−4) |
|  | 01100111111001 | ( 4) |  | 00110001111111 | ( 4) |
|  | 10001100111110 | ( 2) |  | 11100011000111 | ( 2) |
|  | 01110001100001 | (−2) |  | 00011100111000 | (−2) |

FIG. 26(f)

| No. | Code words | DP | No. | Code words | DP |
|---|---|---|---|---|---|
| 179 | 111100000001100 | (-4) | 191 | 100000110000111 | (-2) |
|  | 000111111110011 | ( 4) |  | 011111100111000 | ( 2) |
|  | 111100110000111 | ( 2) |  | 100111111000111 | ( 4) |
|  | 000110011111000 | (-2) |  | 011100000111000 | (-4) |
| 180 | 111100000110000 | (-4) | 192 | 100000011100111 | (-2) |
|  | 000111111001111 | ( 4) |  | 011111100111000 | ( 2) |
|  | 111100001100111 | ( 2) |  | 100011111100111 | ( 4) |
|  | 000111100110000 | (-2) |  | 011100000110000 | (-4) |
| 181 | 111000110000000 | (-4) | 193 | 110000111000001 | (-2) |
|  | 000111001111111 | ( 4) |  | 001111000111110 | ( 2) |
|  | 111000000011111 | ( 2) |  | 111100011110001 | ( 2) |
|  | 000111111100000 | (-2) |  | 000011100001110 | (-2) |
| 182 | 100001111100001 | (-2) | 194 | 110000011100001 | (-2) |
|  | 011110000111110 | ( 2) |  | 001111100011110 | ( 2) |
|  | 100111110011100 | ( 2) |  | 111100111000001 | ( 2) |
|  | 011000011000011 | (-2) |  | 000011000111110 | (-2) |
| 183 | 100000111110001 | (-2) | 195 | 110000001111001 | (-2) |
|  | 011111000011110 | ( 2) |  | 001111110000110 | ( 2) |
|  | 100110011111100 | ( 2) |  | 111110000111001 | ( 2) |
|  | 011001100000011 | (-2) |  | 000011111000110 | (-2) |
| 184 | 100000011111001 | (-2) | 196 | 110001100000011 | (-2) |
|  | 011111110000110 | ( 2) |  | 001100111111100 | ( 2) |
|  | 100111001100100 | ( 2) |  | 111110001100011 | ( 2) |
|  | 011000001100011 | (-2) |  | 000011100111100 | (-2) |
| 185 | 100011001100001 | (-2) | 197 | 110011000000011 | (-2) |
|  | 011100110011110 | ( 2) |  | 001100111111100 | ( 2) |
|  | 100011111110000 | ( 2) |  | 111110011000011 | ( 2) |
|  | 011100000000111 | (-2) |  | 000011001111100 | (-2) |
| 186 | 100110011100001 | (-2) | 198 | 110000000011111 | (-2) |
|  | 011001100011110 | ( 2) |  | 001111111100000 | ( 2) |
|  | 100111111110000 | ( 2) |  | 111110000110011 | ( 2) |
|  | 011000000001111 | (-2) |  | 000011111001100 | (-2) |
| 187 | 100001100110001 | (-2) | 199 | 111000110000001 | (-2) |
|  | 011110011001110 | ( 2) |  | 000111001111110 | ( 2) |
|  | 100111111110001 | ( 2) |  | 111110000001111 | ( 2) |
|  | 011000000001110 | (-4) |  | 000011111110000 | (-2) |
| 188 | 100011100000011 | (-2) | 200 | 111001100000001 | (-2) |
|  | 011100011111100 | ( 2) |  | 000110011111110 | ( 2) |
|  | 100011111111001 | ( 4) |  | 111110001100001 | ( 2) |
|  | 011100000000110 | (-4) |  | 000001110011110 | (-2) |
| 189 | 100111000000011 | (-2) | 201 | 111000000000111 | (-2) |
|  | 010001111111100 | ( 2) |  | 000111111111000 | ( 2) |
|  | 100111111100011 | ( 4) |  | 111110011000001 | ( 2) |
|  | 011000000011100 | (-4) |  | 000001100111110 | (-2) |
| 190 | 100001100001111 | (-2) | 202 | 111110000000001 | (-2) |
|  | 011110011110000 | ( 2) |  | 000001111111110 | ( 2) |
|  | 100011111100011 | ( 4) |  | 111110000110011 | ( 2) |
|  | 011100000001100 | (-4) |  | 000001111001100 | (-2) |

FIG. 26 (g)

| No. | Code words | DP | No. | Code words | DP |
|---|---|---|---|---|---|
| 203 | 1000110000 1110 | (−2) | 215 | 1000000 0111001 | (−4) |
|  | 0111001111 0001 | ( 2) |  | 0111111 1000110 | ( 4) |
|  | 1001111000 1111 | ( 4) |  | 1000111 1111100 | ( 4) |
|  | 0110000111 0000 | (−4) |  | 0111000 0000011 | (−4) |
| 204 | 1000111000 0110 | (−2) | 216 | 1000000 1100011 | (−4) |
|  | 0111000111 1001 | ( 2) |  | 0111110 0111100 | ( 4) |
|  | 1000111100 1111 | ( 4) |  | 1001111 1111000 | ( 4) |
|  | 0111000010 0000 | (−4) |  | 0110000 0000111 | (−4) |
| 205 | 1001100000 1110 | (−2) | 217 | 1100001 1000110 | (−2) |
|  | 0110011111 0001 | ( 2) |  | 0011110 0111001 | ( 2) |
|  | 1001110001 1111 | ( 4) |  | 1111110 0000111 | ( 2) |
|  | 0110001110 0000 | (−4) |  | 0000011 1111000 | (−2) |
| 206 | 1000001110 0110 | (−2) | 218 | 1100011 0001100 | (−2) |
|  | 0111110001 1001 | ( 2) |  | 0011100 1110011 | ( 2) |
|  | 1000111001 1111 | ( 4) |  | 1111110 0000011 | ( 2) |
|  | 0111000110 0000 | (−4) |  | 0000001 1111100 | (−2) |
| 207 | 1001100001 1100 | (−2) | 219 | 1100110 001 1000 | (−2) |
|  | 0110011110 0011 | ( 2) |  | 0011001 1100111 | ( 2) |
|  | 1001100011 1111 | ( 4) |  | 1111111 0000001 | ( 2) |
|  | 0110011100 0000 | (−4) |  | 0000000 1111110 | (−2) |
| 208 | 1000001111 1000 | (−2) | 220 | 1100011 1100000 | (−2) |
|  | 0111110000 0111 | ( 2) |  | 0011100 0011111 | ( 2) |
|  | 1000110011 1111 | ( 4) |  | 1100000 1111110 | ( 2) |
|  | 0111001100 0000 | (−4) |  | 0011111 0000001 | (−2) |
| 209 | 1000110011 1000 | (−2) | 221 | 1110000 1110000 | (−2) |
|  | 0111000110 0111 | ( 2) |  | 0001111 1000111 | ( 2) |
|  | 1000011111 1110 | ( 4) |  | 1100111 0001110 | ( 2) |
|  | 0111100000 0001 | (−4) |  | 0011000 1110001 | (−2) |
| 210 | 1000111110 0000 | (−2) | 222 | 1111100 0000110 | (−2) |
|  | 0111000001 1111 | ( 2) |  | 0000111 1111001 | ( 2) |
|  | 1001111001 1110 | ( 4) |  | 1100011 101110 | ( 2) |
|  | 0110000110 0001 | (−4) |  | 0011100 010001 | (−2) |
| 211 | 1000000110 0001 | (−6) | 223 | 1111000 1100000 | (−2) |
|  | 0111111001 1110 | ( 6) |  | 0000111 00111111 | ( 2) |
|  | 1001110011 1110 | ( 4) |  | 1100110 0011110 | ( 2) |
|  | 0110001100 0001 | (−4) |  | 0011001 1100001 | (−2) |
| 212 | 1000000001 1001 | (−6) | 224 | 1100000 011000 | (−6) |
|  | 0111111110 0110 | ( 6) |  | 0011111 100111 | ( 6) |
|  | 1001110011 1110 | ( 4) |  | 1100011 00111 10 | ( 2) |
|  | 0110000011 0001 | (−4) |  | 0011100 1100001 | (−2) |
| 213 | 1000001110 0000 | (−6) | 225 | 1100011 0000000 | (−6) |
|  | 0111110001 1111 | ( 6) |  | 0011100 1111111 | ( 6) |
|  | 1001100111 1110 | ( 4) |  | 1100111 1000111 | ( 2) |
|  | 0110011000 0001 | (−4) |  | 0011000 0111001 | (−2) |
| 214 | 1000001110 0001 | (−4) | 226 | 1100000 0110001 | (−4) |
|  | 0111110001 1110 | ( 4) |  | 0011111 1001110 | ( 4) |
|  | 1001111100 1110 | ( 4) |  | 1100011 1100110 | ( 2) |
|  | 0110000011 1001 | (−4) |  | 0011100 0011001 | (−2) |

FIG. 26(h)

| No. | Code words | DP | No. | Code words | DP |
|---|---|---|---|---|---|
| 227 | 11000000011100 | (-4) | 239 | 10011000001100 | (-4) |
|  | 00111111100011 | ( 4) |  | 01100111110011 | ( 4) |
|  | 11000011111100 | ( 2) |  | 10011111001111 | ( 6) |
|  | 00111100000011 | (-2) |  | 01100000110000 | (-6) |
| 228 | 11000110000000 | (-4) | 240 | 10011000011000 | (-4) |
|  | 00111000111111 | ( 4) |  | 01100111100111 | ( 4) |
|  | 11001110011100 | ( 2) |  | 10011100111111 | ( 6) |
|  | 00110001100011 | (-2) |  | 01100001100000 | (-6) |
| 229 | 11100000011000 | (-4) | 241 | 10001100110000 | (-4) |
|  | 00011111100111 | ( 4) |  | 01110011001111 | ( 4) |
|  | 11001100111100 | ( 2) |  | 10011100111111 | ( 6) |
|  | 00110011000011 | (-2) |  | 01100011000000 | (-6) |
| 230 | 11100110000000 | (-4) | 242 | 10011110000000 | (-4) |
|  | 00011001111111 | ( 4) |  | 01100001111111 | ( 4) |
|  | 11001111001100 | ( 2) |  | 10011001111111 | ( 6) |
|  | 00110000110011 | (-2) |  | 01100110000000 | (-6) |
| 231 | 11001110000001 | (-2) | 243 | 11100000001110 | (-2) |
|  | 00110001111110 | ( 2) |  | 00011111110001 | ( 2) |
|  | 11000111111000 | ( 2) |  | 11100111000110 | ( 2) |
|  | 00111000000111 | (-2) |  | 00011000111001 | (-2) |
| 232 | 11000001100011 | (-2) | 244 | 11100011100000 | (-2) |
|  | 00111001100111 | ( 2) |  | 00011100011111 | ( 2) |
|  | 11001111110000 | ( 2) |  | 11100011100110 | ( 2) |
|  | 00110000001111 | (-2) |  | 00011100011001 | (-2) |
| 233 | 11100001100001 | (-2) | 245 | 11110000011000 | (-2) |
|  | 00011110011110 | ( 2) |  | 00001111100111 | ( 2) |
|  | 11100000111110 | ( 2) |  | 11100001111100 | ( 2) |
|  | 00011111000001 | (-2) |  | 00011110000011 | (-2) |
| 234 | 11100000011001 | (-2) | 246 | 11000001100000 | (-6) |
|  | 00011111100110 | ( 2) |  | 00111100111111 | ( 6) |
|  | 11100110001110 | ( 2) |  | 11100110011100 | ( 2) |
|  | 00011001110001 | (-2) |  | 00011001100011 | (-2) |
| 235 | 10000000111110 | (-2) | 247 | 11000001100001 | (-4) |
|  | 01111111000001 | ( 2) |  | 00111110011110 | ( 4) |
|  | 10011111111001 | ( 6) |  | 11100111001100 | ( 2) |
|  | 01100000000110 | (-6) |  | 00011000110011 | (-2) |
| 236 | 11000011001100 | (-2) | 248 | 11000000110001 | (-4) |
|  | 00111100110011 | ( 2) |  | 00111111001110 | ( 4) |
|  | 11100011001110 | ( 2) |  | 11100011111000 | ( 2) |
|  | 00011100110001 | (-2) |  | 00011100000111 | (-2) |
| 237 | 10000110000110 | (-4) | 249 | 11100000000110 | (-4) |
|  | 01111001111001 | ( 4) |  | 00011111111001 | ( 4) |
|  | 10011111110011 | ( 6) |  | 11100111110000 | ( 2) |
|  | 01100000001100 | (-6) |  | 00011000001111 | (-2) |
| 228 | 10000001100110 | (-4) | 250 | 11000111000001 | (-2) |
|  | 01111110011001 | ( 4) |  | 00111000111110 | ( 2) |
|  | 10011111100111 | ( 6) |  | 11110000011110 | ( 2) |
|  | 01100000011000 | (-6) |  | 00001111100001 | (-2) |

FIG. 26(i)

| N | Code words | DP |
|---|---|---|
| 251 | 110000001100011 | (-2) |
| | 001111111001100 | ( 2) |
| | 111100110000110 | ( 2) |
| | 000011001111001 | (-2) |
| 252 | 111110000000011 | (-2) |
| | 000011111111100 | ( 2) |
| | 111100011001110 | ( 2) |
| | 000011100111001 | (-2) |
| 253 | 110000011100000 | (-4) |
| | 001111110001111 | ( 4) |
| | 111110000111100 | ( 2) |
| | 000011110000011 | (-2) |
| 254 | 111000011000000 | (-4) |
| | 000111100111111 | ( 4) |
| | 111100110011100 | ( 2) |
| | 000011001100011 | (-2) |
| 255 | 110000110000011 | (-2) |
| | 001111001111100 | ( 2) |
| | 111100011110000 | ( 2) |
| | 000011100001111 | (-2) |
| 256 | 111000000110001 | (-2) |
| | 000111111001110 | ( 2) |
| | 111100111100000 | ( 2) |
| | 000011000011111 | (-2) |
| 257 | 110000111100000 | (-2) |
| | 001111100001111 | ( 2) |
| | 111110000001110 | ( 2) |
| | 000001111110001 | (-2) |
| 258 | 110000000111110 | (-2) |
| | 001111111100001 | ( 2) |
| | 111110000111100 | ( 2) |
| | 000001111100011 | (-2) |
| 259 | 110000110011110 | (-2) |
| | 001111110011001 | ( 2) |
| | 111110001110000 | ( 2) |
| | 000001110001111 | (-2) |

FIG. 27

| No. | CODE WORD | DP | REMARK |
|---|---|---|---|
| 1 | 10011001 | 0 | {C200i} |
| 2 | 10000111 | 0 | {C200i} |
| 3 | 11000011 | 0 | {C210i} |
| 4 | 11100001 | 0 | {C210i} |
| 5 | 10001110 | 0 | {C200i} |
| 6 | 10011100 | 0 | {C200i} |
| 7 | 11000110 | 0 | {C210i} |
| 8 | 11001100 | 0 | {C210i} |
| 9 | 11110000 | 0 | {C210i} |
| 10 | 10001111 | 2 | {C20pi} |
|    | 10000011 | -2 | {C20mi} |
| 11 | 11000111 | 2 | {C21pi} |
|    | 11000001 | -2 | {C21mi} |
| 12 | 11100011 | 2 | {C21pi} |
|    | 11100000 | -2 | {C21mi} |
| 13 | 11110001 | 2 | {C21pi} |
|    | 11000000 | -4 | {C21mi} |
| 14 | 10011110 | 2 | {C20pi} |
|    | 10000110 | -2 | {C20mi} |
| 15 | 10011111 | 4 | {C20pi} |
|    | 10001100 | -2 | {C20mi} |
| 16 | 10011000 | -2 | {C20mi} |
|    | 11001111 | 4 | {C21p0i} |

METHOD AND APPARATUS FOR CONVERTING A RUN LENGTH LIMITED CODE

BACKGROUND OF THE INVENTION

The present invention relates to method and apparatus for converting a run length limited (RLL) code for converting m-bit data words to n-bit code words while constraining the minimum number of continuous bits having the same binary value to d and the maximum number of continuous bits having the same binary value to k in a bit sequence generated by concatenation of the code words.

The RLL code is usually used in recording digital data at a high record density on a magnetic tape or a magnetic disk.

The RLL code is defined as the code in which a minimum number of continuous bits having the same binary value is constrained to d and the maximum number of continuous bits having the same binary value is constrained to k. The RLL code having such a property is generated by converting m-bit data words (each having a bit length of T) to n-bit code words, where n is larger than m.

In such an RLL code, the interval $T_w$ required to identify one bit (hereinafter referred to as a detection window) is m/nT and the minimum interval between transitions $T_{min}$ is $d \cdot T_w$.

In a recording and reproducing system, intersymbol interference usually occurs because high frequency components are cut off. In order to minimize the intersymbol interference, it is desirable for $T_{min}$ to be long. In order to suppress an influence by a time-axis variation such as a peak shift and jitter due to the intersymbol interference, it is desirable for the detection window $T_w$ to be long. In addition, in order to attain a self-clocking function, it is desirable for the maximum number of continuous bits k to be small.

In view of the above, various RLL codes have been developed such the 8/10 conversion code (ref. No. 1), the 8/9 conversion code (ref. No. 2), the 8/16 conversion code (ref. No. 3), the 2/3 conversion code (ref. No. 4), the 3PM code (ref. No. 5), the HDM-3 code (ref. No. 6) and the (2, 7) RLLC code (ref. No. 7). These references are identified below.

The 8/10 conversion code is an RLL code in which d=1, k=10, m=8, n=10, $T_w$=0.8T and $T_{min}$=0.8T in accordance with the above definitions.

The 8/9 conversion code is an RLL code in which d=1, k=14, m=8, n=9, $T_w$=8/9T and $T_{min}$=8/9T.

The 8/16 conversion code is an RLL code in which d=2, k=6, m=8, n=16, $T_w$=0.5T and $T_{min}$=T.

Those three RLL codes are DC free codes which do not include a D.C. component and in which $T_w$ has a larger weight than $T_{min}$.

Since those RLL codes were developed primarily for a digital VTR in which low frequency components are cut off by a rotary transformer, they are DC free in nature and have a large $T_w$ because of a requirement for an extremely high recording density. On the other hand, those RLL codes have a large k.

The DC free code is defined as a code in which the difference between the number of "1"s and the number of "0"s included between any two bits in a bit sequence generated by concatenation of code words is definite. Digital Sum Variation (DSV) is referred to as the variation in the running sum of a bit sequence after conversion and the difference between the number of "1"s and the number of "0"s in the code word is referred to as disparity (DP).

On the other hand, the 2/3 conversion code is a variable length RLL code (ref. No. 7) in which d=2, k=8, m=2, n=3, $T_w$=2/3T, and $T_{min}$=4/3T in accordance with the above definitions.

The 3PM code is an RLL code in which d=3, k=12, m=3, n=6, $T_w$=0.5T and $T_{min}$=1.5T.

The HDM-3 code is an RLL code in which d=6, k=25, m=4, n=12, $T_w$=T/3 and $T_{min}$=2T.

The (2, 7) RLLC code is a variable length RLL code in which d=3, k=8, m=1, n=2, $T_w$=T/3 and $T_{min}$=2T.

A theoretical constraint of $T_w$ for any given d and k is known (except for the DC free code). The theoretical constraints $T_w^*$ (ref. No. 8) for the given d and k in the 2/3 conversion code, 3PM code, HDM-3 code and (2, 7) RLLC code are shown below.

$\frac{2}{3}$ conversion code:    $T_w^* = 0.67T > \frac{2}{3}T$

3PM code:    $T_w^* = 0.545T > 0.5T$

HDM-3 code:    $T_w^* = 0.361T > \frac{T}{3}$ (2, 7) RLLC:    $T_w^* = 0.517T > 0.5T$ This means that an RLL code having a higher performance exists. For example, k may be reduced while $T_w$ is kept unchanged or $T_w$ may be increased while k is reduced.

However, in the past, there has been no systematic coding rule to satisfying optional values of the d, k-constraint and the coding rule has been determined on a trial and repeat basis. Accordingly, it has been very difficult to generate an RLL code having a closer performance to the theoretical constraint.

The above reference Nos. 1 to 8 are as follows.

No. 1. Japanese Patent Laid-open specification No. 54-158135 "Digital Prossessor System".

No. 2. Japanese Patent Laid-open specification No. 57-176866 "Binary Signal Encoder".

No. 3. M. Artigaras, "8/16 A New Channel Coding for Digital VTR", 12th International Television Symposium and Technical Exhibition, Program of Equipment Innovations Sections, P261, 1981.

No. 4. T. Horiguchi, et. al, "An Optimization of Modulation Codes in Digital Recording", IEEE Trans. MAG., Vol. 12, No. 6, November 1976.

No. 5. G. V. Jacoby, "A New Look Ahead Code for Increased Data Density", IEEE Trans. MAG., Vol. 13, No. 5, PP. 1202–1204, September 1977.

No. 6. Japanese Patent Laid-open specification No. 55-141852 "Data Conversion System".

No. 7. P. A. Franaszek, "RUN-LENGTH-LIMITED VARIABLE LENGTH CODING WITH ERROR PROPAGATION LIMITATION", U.S. Pat. No. 3,689,899, September 1972.

No. 8. D. T. Tang and L. R. Bahl, Information & Control. 17, No. 5, P. 436, 1970.

SUMMARY OF THE INVENTION

It is an object of the present invention to provide a systematic code conversion method and apparatus which can readily generate a substantially optimum RLL code for a given d and k.

In accordance with the present invention, each of $2^{n_i}$ code words ($1 \leq i \leq i_{max}$) each consisting of $n_i$ bits is divided into three blocks: a leading block L of the code word, and end block R and an intermediate block between the block L and the block R. Usable code words are selected in accordance with a value uniquely determined for the given d and k, and a uniquely determined concatenation rule for the selected code words is introduced so that a d, k-constrained RLL code having a higher performance can be readily generated.

BRIEF DESCRIPTION OF THE DRAWINGS

FIG. 7 shows code words in an RLL code in which d=5, k=18, $m_{min}=2$, $n_{min}=5$ and $i_{max}=6$, FIG. 9 shows a portion of an input/output table for the code converter of FIG. 8, FIG. 10 is a timing chart for FIG. 8, FIG. 12 shows a portion of an input/output table for the code reverse-converter of FIG. 11, FIG. 13 shows code words in an RLL code in which d=6, k=16, $m_{min}=2$, $n_{min}=6$ and $i_{max}=4$, FIG. 14 shows code words in an RLL code in which d=2, k=7, $m_{min}=2$, $n_{min}=3$ and $i_{max}=5$, FIG. 15 shows code words which are not used in the code of FIG. 14, FIG. 16 shows code words in an RLL code different from that of FIG. 14, in which d=2, k=7, $m_{min}=2$, $n_{min}=3$ and $i_{max}=5$, FIG. 17 shows code words in an RLL code in which d=3, k=8, $m_{min}=1$, $n_{min}=2$ and $i_{max}=3$, FIG. 18 shows a concatenation rule for code words in a DC free RLL code in which d=1, FIG. 20 shows code words in a DC free RLL code in which d=1, k=4, m=8 and n=10, FIG. 21 shows number of code words usable in the DC free RLL code in which d=1, k=7 and n—10, FIG. 22 shows the number of code words usable in the DC free RLL code in which d=1, k=6 and n=8, FIG. 25 shows a concatenation rule for code words in the DC free RLL code in which $d \geq 2$, FIG. 26 shows code words in a DC free RLL code in which d=2, k=8, m=8 and n=14, and FIG. 27 shows code words in a DC free RLL code in which d=2, k=9, m=4 and n=8.

DESCRIPTION OF THE PREFERRED EMBODIMENTS

Figure 1:
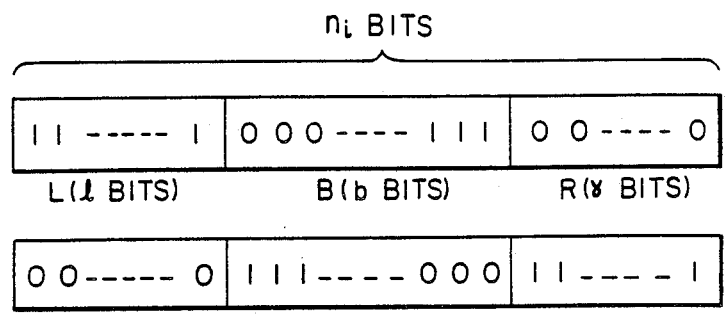
FIG. 1 shows the format of a code word.

Each $n_i$-bits code word can be divided into three blocks as shown in FIG. 1. They are a leading block L of the code word consisting of l continuous bits of the same binary value, an end block R of the code word consisting of $\gamma$ continuous bits of the same binary value and an intermediate block B of the code word consisting of b bits, where $b = n_i - l - \gamma \geq 0$.

The blocks L and R will be explained later. In order to satisfy the d, k-constraint, it is apparent that at least the block B of the code word must satisfy the d, k-constraint.

A first condition on the block B of the code word for selecting the code word which satisfies the d, k-constraint is that (i) the block B of the code word consisting of $b(=n_i - l - \gamma \geq 0)$ bits includes no less than d and no more than k continuous "0" bits and "1" bits alternately, except when b=0.

The blocks L and R will now be explained for the constraints on l and $\gamma$ when (I) d=1 and (II) $d \geq 2$. Those constraints are imparted so that the d, k-constraint is satisfied by the concatanation of the code words. They cannot be considered separately from the concatenation rule of the code words.

Figure 2:
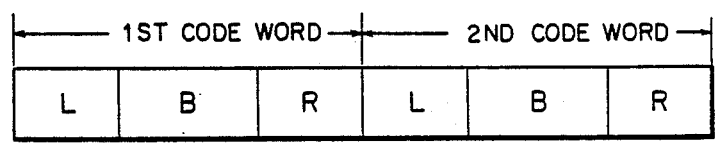
FIG. 2 shows concatenation of code words.

The term concatenation of the code words means the concatenation of a first code word (W1) and a second code word (W2) as shown in FIG. 2, in which $l_j$ is the number of bits in the block L in the j-th code word (j=1, 2) and $\gamma_j$ is the number of bits in the block R. A concatenation portion of the code words means ($\gamma_1 + l_2$) bits of the block R of the first code word and the block L of the second code word. LB indicates the binary value of the bits in the block R of the first code word.

(I) d=1

In this case, only the K-constrint should be considered. Accordingly, in order to assure that the concatenation portion of the concatenated code word does not include more than k continuous bits of the same binary value, $\gamma_1$ and $l_2$ must satisfy the following relation.

$$\gamma_1 + l_2 \leq k \tag{1}$$

$\gamma_1$, $l_2$ and x are defined as follows.

$$1 \leq \gamma_1 \leq k-x, \ 1 \leq l_2 \leq x, \ 1 \leq x < k-1 \tag{2}$$

By the concatenation of the code words constrained by the equations (2), it is apparent that the number of continuous bits of the same binary value is no smaller than 1 and no larger than k. Since the equations (2) are equally applicable to $\gamma_2$ and $l_1$, the equations (2) are conditions for $\gamma$ and l, which are expressed as $$1 \leq \gamma \leq k-x, \ 1 \leq l \leq x, \ 1 \leq x \leq k-1 \tag{3}$$

The code words which are constrained by the condition (i) for the block B and the conditions for the blocks L and R shown by the equations (3) are expressed by $\{C10_i\}$.

The concatenation of the code words contained in $\{C10_i\}$ always satisfies the equation (1). Accordingly, when any two code words contained in $\{C10_i\}$ are concatenated, the number of continuous bits of the same binary value in the concatenation portion is no smaller than 1 and no larger than k. Accordingly, the code words contained in $\{C10_i\}$ have one-to-one correspondence to data words.

On the other hand, when the binary value LB of the bits in the block R of the first code word and the binary value of the bits in the block L of the second code word are different from each other, it is also possible to use code words free from the equations (3). Namely two kinds of code words can be selectively used according to values of LB the such that if LB=0 the use is made of a code word whose block L is composed of the bits of the binary value "1", and if LB is "1" use is made of a code word whose block L is composed of the bits of the binary value "0".

In this manner, the code word constrained by the equations (4) on the blocks R and L may be used.

$$1 \leq \gamma \leq k-x, \; x+1 \leq l \leq k, \; 1 \leq x \leq k-1 \quad (4)$$

The code words which are constrained by the condition (i) for the block B and the conditions shown by the equations (4) are expressed as $\{Cx11_i\}$. When an equation (5) holds, a code word having $n_i$ bits of the same binary value is included in $\{CX11_i\}$.

$$n_i + x \leq k \quad (5)$$

Figure 3:
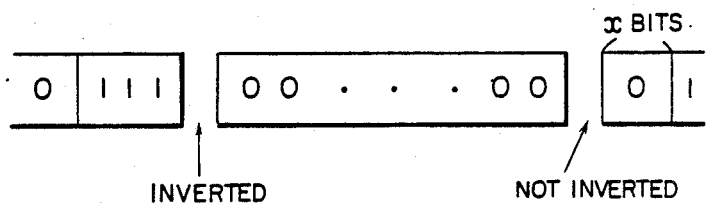
FIG. 3 shows concatenation of code words which have maximum numbers of continuous bits of the same binary value when d=1.

As seen from FIG. 3, when the code word having $n_i$ bits of the same binary value is used as the first code word, the maximum number of continuous bits of the same binary value in the concatenation portion is $n_i + x$ when the second code word is selected from $\{C10_i\}$, $l=x$ and the block L of the second code word has the same binary value as that of the first code word.

Accordingly, if the equation (5) is met, the k-constraint is satisfied.

As described above, the code word contained in $\{CX11_i\}$ starts with "1" or "0" depending on LB. Accordingly, those code words are grouped to a set (two words) and one data word is assigned to each set of code words.

Usually, the set of code words are a combination of a code word which is contained in $\{CX11_i\}$ and which starts with a "1" bit (hereinafter referred to as a front pattern) and a code pattern which start with a "0" bit, with "0" bits and "1" bits of the front pattern being substituted by "1" bits and "0" bits, repectively (hereinafter referred to as a back pattern). For example, when the front pattern code word is $C11_i$="1111", the back pattern code word is $\overline{C11_i}$="0000".

Of the code words contained in $\{CX11_i\}$, the code words starting with "1" are represented by $\{C11_i\}$, and a code word consisting of a back pattern $\overline{C11_i}$ of any code word $C11_i$ contained in $\{C11_i\}$ is represented by $\{\overline{C11_i}\}$.

By using the code words $\{C10_i\}$, $\{C11_i\}$ and $\{\overline{C11_i}\}$ constrained by the condition (i) on the block B and the conditions on the blocks L and R shown by the relations (3) and (4) and using the correspondence relation with the data words and the concatenation rule, the RLL code for any k (d=1) can be constructed.

Figures 4, 5, 6:
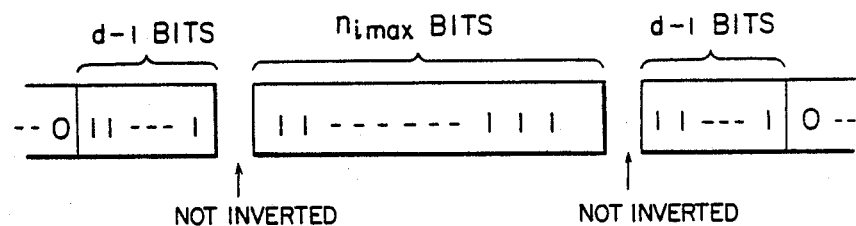
FIG. 4 shows a concatenation rule of code words when d=1.
FIG. 5 shows concatenation of code words which have maximum numbers of continuous bits of the same binary value when $d \geq 2$.
FIG. 6 shows a concatenation rule of code words when d=2.

FIG. 4 shows the relation between the data words and the code words and the concatenation rule of the code words.

As seen from FIG. 4, the code word which meets the constraint of the equation (3) has no difference between the front pattern and the back pattern. Thus, a value $I_{NV1}$ which is "0" for the front pattern and "1" for the back pattern is represented by $$I_{NV1} = F_1 \cdot LB \quad (6)$$

In FIG. 4 and the equation (6), the value $F_1$ is "0" for the code words contained in $\{C10_i\}$ and "1" for the $\{C11_i\}$ and $\{\overline{C11_i}\}$. The symbol "·" represents a logical AND function.

Because of the systematic constraint on the blocks L and R, the switching logic for the front pattern and the back pattern can be readily constructed.

(II) $d \geq 2$

In this case, the blocks L and R need not meet the d-constraint but the d-constraint may be not by the concatenation of the code words as shown in equation (7).

$$\gamma_1 + l_2 \geq d \quad (7)$$

where
$$d - y \leq \gamma_1 < k, \; y \leq l \leq k, \; 1 \leq y \leq d-1 \quad (8)$$

In the concatenation of the code words constrained by the equations (8), the d-constraint should be considered if the block R of the first code word and the block L of the second code word have different binary values from each other, and the k-constraint should be considered if those blocks have the same binary value.

The problem caused by the concatenation of the code words and the solution therefor by the present invention are described below.

(II.1) The block R of the first code word comprises "0"s and the block L of the second code word comprises "1"s.

(II.1.1) If $d-y \leq \gamma_1 \leq d-1$ and $y \leq l_2 \leq k$, the d-constraint is not met. The d-constraint is met if the second code word is inverted to the back pattern. In order to meet the k-constraint concurrently, equation (9) must be met.

$$\gamma_1 + l_2 \leq k \quad (9)$$

Since maximum value of $\gamma_1$ is d-1, the following relation is met from the equation (8)

$$y \leq l_2 \leq k - d + 1 \quad (10)$$

(II.1.2) If $d-y \leq \gamma_1 \leq k$ and $y \leq l_2 \leq d-1$, the following relation is met.

$$d - y \leq \gamma_1 \leq k - d + 1 \quad (11)$$

(II.1.3) If $d \leq \gamma_1 \leq k-d+1$ and $d \leq l_2 \leq k-d+1$, the d, k-constraint is met if the second code word in the front pattern is concatenated.

When the block R of the first code word comprises "1"s and the block L of the second code word comprises "0"s, the same description as that for (II.1) applies.

(II.2) The block R of the first code word and the block L of the second code word have the same binary value.

Only when $d \leq \gamma_1$, and $d \leq l_2$, the second code word is modified to start with the binary value opposite to the binary value of the block R of the first code word.

The conditions on the blocks L and R of the code word are given by equations (12), and the RLL code which meets the condition (i) on the block B and the d, k-constraint can be constructed.

$$d - y \leq \gamma \leq k - d + 1, \; y \leq l \leq k - d + 1, \; 1 \leq y \leq d - 1 \quad (12)$$

Of the code words which meet the equations (12) and the condition (i) on the block B, the code words in which $l \leq d-1$ and which start with "1" are represented by $\{C20_i\}$, the back patterns thereof are represented by $\{\overline{C20_i}\}$, the code words in which $d \leq 1$ and which start with "1" are represented by $\{C21_i\}$ and the back patterns thereof are represented by $\{\overline{C21_i}\}$.

When $n \leq d$ and an equation (13) is met, the code word having all "1" bits is included in $\{C21_i\}$, and the code word having all "0" bits is included in $\{\overline{C21_i}\}$, $$n_i + 2(d-1) \leq k \quad (13)$$

As seen from the concatenation rule and FIG. 5, when the n bits of the code word have the same binary value, the maximum number of continuous bits of the same binary value is $n_i + 2(d-1)$. Accordingly, if it is no larger than k, the k-constraint is always met.

As seen from (II.1) and (II.2), the second code word is in the front pattern or the back pattern depending on whether the number of continuous bits of the same binary value in the block R of the first code word is no smaller than d or not and whether the binary value LB of the block R of the first code word is "1" or "0", and whether the number of continuous bits of the same binary value in the block L of the second code word is no smaller than d or not. Accordingly, two code words (front pattern and back pattern) are assigned to each data word.

FIG. 6 shows the concatenation rule of the code words expained in (II.1) and (II.2). In FIG. 6, $E_2$ is "1" if the number of continuous bits of the same binary value in the block R of the first code word is no smaller than d, and $E_2$ is "0" if the number is no larger than $d-1$. LB indicates the binary value in the block R of the first code word. $F_2$ is "1" if the number of continuous bits of the same binary value in the block L of the first code word is no smaller than d and $F_2$ is "0" if the number is no larger than $d-1$. $INV_2$ is "0" if the second code word is the front pattern and $INV_2$ is "1" if the second code word is the back pattern.

From FIG. 6, the control signal $INV_2$ for switching the front pattern and the back pattern is given by $$INV_2 = \overline{LB \oplus (E_2 \cdot F_2)} \quad (14)$$

where "." represents a logical AND function, "$\oplus$" represents an exclusive OR function and "—" represent a NOT function.

The control of switching of the front pattern and the back pattern, which appears to be complex at a first glance, can be implemented by very simple logic as shown by the equation (14) so long as the code words defined by the equation (12) of the present invention are used.

The RLL codes constructed in accordance with (II) are explained below. The RLL code in which $d=1$ is omitted here because the DC free RLL code to be described later is more important.

Embodiment 1

FIG. 7 shows the RLL code in which $d=5$, $k=18$, $T_w=0.4T$ and $T_{min}=2T$. When compared with the conventional HDM-3 code having the same $T_{min}$, $T_w$ of the code is larger by 21% and k is smaller by 15%. Accordingly, this code is much more suitable for high density recording than the HDM-3 code.

This code (hereinafter referred to as the (5, 18) code) is constructed from the equation (12) in which $y=2$. An RLL code having an equivalent performance can be constructed when $y=3$.

The value $y=2$ or 3 was selected for the following reason. The number of 1's in the range defined by the equation (12) is $(k-d+1-y+1)$, and the number of $\gamma$'s is $(k-d+1-d+y+1)$. Accordingly, the number $N_c$ of combinations of 1's and $\gamma$'s is given by $$\begin{aligned} N_c &= (k - d + 2 - y)(k - 2d + 2 + y) \\ &= -\left(y - \frac{d}{2}\right)^2 + (k - d + 2)(k - 2d + 2) + \frac{d^2}{4} \end{aligned}$$

The value of $N_c$ is at a maximum when $y=d/2$. Since y is an integer, if y is an odd number, the value of $N_c$ is maximum when y is an integer closest to $d/2$.

The number of code words contained in $\{C20_i\}$, $\{C21_i\}$ and their back patterns increases as $N_c$ increases. The number of code words contained in $\{C20_i\}$, $\{C21_i\}$ and their back pattern is at a maximum when y is selected to maximize the value of $N_c$.

The y which maximizes the value of $N_c$ for two or more d's is given by an equation (15)

$$y = \lceil d/2 \rceil \text{ or } y = d - \lceil d/2 \rceil \quad (15)$$

where $\lceil \ \rceil$ is a Gauss symbol and $\lceil A \rceil$ represents a maximum integer not exceeding A.

The RLL code which meets $d=5$, $k=18$, $T_w=0.4T$ cannot be constructured when $y=1$ or $y=4$.

The (5,18) code shown in FIG. 7 is a variable length RLL code and a plurality of code word lengths are used, and the following relation holds for the number of bits mi of the data word and the number of bits ni of the code word corresponding to that data word: $mi = im_{min}$, $ni = in_{min}$ for $m_{min} = m_1$, and $n_{min} = n_1$.

Each of the code words used in the (5,18) code never appear by the concatenation of the other code words used in the (5,18) code in accordance with the concatenation rule shown in FIG. 6.

This will be explained for a specific example.

5-bit code words No. 1 and No. 2 in FIG. 7 are concatenated in accordance with the concatenation rule of FIG. 5 to obtain the following four bit sequences.

```
11000 + 00111   (No. 1 + No. 1)
11000 + 00000   (No. 1 + No. 2)
11111 + 11000   (No. 2 + No. 1)
11111 + 00000   (No. 2 + No. 2)
```

Those four bit sequences having the bit length of ten are different from ten-bit code words No. 3 to No. 6 of FIG. 7.

Similarly, a 15-bit code word No. 15 is constructed by concatenation of the 10-bit code word No. 5 and a back pattern $\overline{\text{No. 2}}$ of the 5-bit code word No. 2, as shown below.

$$111000000000000 = 1110000000 + 00000$$

(No. 15 = No. 5 + $\overline{\text{No. 2}}$)

However, in accordance with the above concatenation rule, the code words No. 5 and No. 2 are concatenated in the following manner.

111000000000000+11111=111000000011111

(No. 5+No. 2)

It is thus seen that the code word No. 15 is not constructed by the concatenation of the code words No. 5 and No. 2.

The same is applicable to all other code words in FIG. 7.

Data words corresponding to the respective code words are also shown in FIG. 7. As seen from FIG. 7, a ratio of the number of bits of the data word and the number of bits of the code word is constantly 2/5. Accordingly, the code transmission rate is constant and $T_w$ is constantly equal to 0.4T.

The assignment of the data word to the code word is determined in the following manner.

(a) Because $T_w=0.4T$, a 2-bit data word is assigned to a 5-bit code word. In the present embodiment, "00" is assigned to the code word No. 1 and "01" is assigned to the code word No. 2. Alternatively, "11" may be assigned to the code word No. 1 and "10" may be assigned to the code word No. 2. In essence, any two of four 2-bit data words are assigned to two 5-bit code words. The assignment shown in FIG. 7 is referenced in the following description.

(b) The data words "00" and "01" have the corresponding code words but the data words "10" and "11" have no corresponding 5-bit code word. Accodingly, they are assigned to 10-bit code words. However, if they are assigned as they are, the ratio of the bit lengths of the data word and the code word is not 2/5. Accordingly, 4-bit data words starting with "01" or "11" are assigned to 10-bit code words. Since there are four 10-bit code words, four data words starting with "10" have their corresponding code words.

(c) In order to supplement four 4-bit data words starting with "11", 15-bit code words are used. The data words are of 6-bit length. There are sixteen data words which start with "11". Since there are nine 15-bit code words, the data words "110000" to "111000" of the 6-bit data words starting with "11" have their corresponding code words.

(d) Data words "11100100" to "11110011" are assigned to 20-bit code words No. 16 to No. 31.

(e) Data words "1111010000" to "1111110001" are assigned to 25-bit code words No. 32 to No. 65.

(f) There are 56 data words from "111111001000" to "111111111111". On the other hand, there are 65 30-bit code words. Accordingly, the 12-bit data words are assigned to the 30-bit code words.

Through (a) to (f), all combinations of the data bit sequences are assigned to the code words so that unique encoding is attained.

Figure 8:
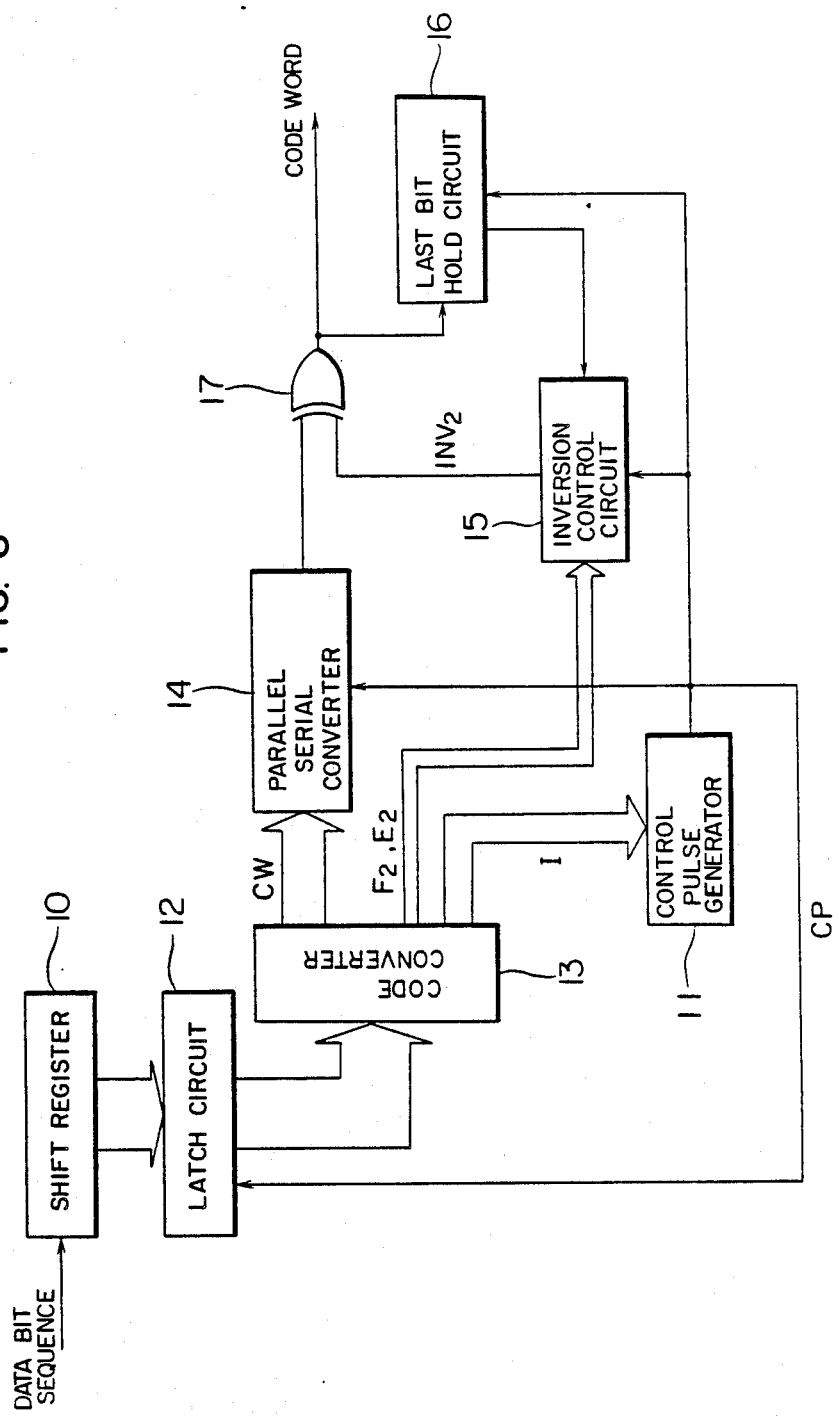
FIG. 8 is a block diagram of an encoder for the RLL code of FIG. 7.

A block diagram of an encoder in the present embodiment is shown in FIG. 8. The operation of the encoder will now be described. Let us assume that a clock frequency to a data bit sequence is $f_d$ (bits/sec) and a clock frequency to a code word is $f_r=5/2f_d$ (bits/sec). Let us assume the following data bit sequence.

$$\underline{01}_{(A)} \quad \underline{111111111111}_{(B)} \quad \underline{111000}_{(C)} \quad \underline{0111100110}_{(D)} \quad (16)$$

Let us assume that there is no data bit sequence before and after the data bit sequence of (16) and (A) in (16) is the beginning of the data bit sequence.

Step 0: Twelve bits from the beginning of (16), that is, $$\alpha = 011111111111$$

are loaded into a 12-bit shaft register 10.

Step 1: The 12 bits loaded into the shift register 10 is latched into a 12-bit latch 12 by a control pulse CP from a control pulse generator 11. The content of the latch 12 is equal to $\alpha$. The 12 bits latched in the latch 12 are supplied to an input terminal of a code converter 13. The code converter 13 produces a code word CW corresponding to the input data word, F2 and E2 described above, and I which indicates a ratio of the number n of bits of CW to $n_{min}=5$ (I=001 when n=5, I=010 when n=10, I=011 when n=15, I=100 when n=20, I=101 when n=25, I=110 when n=30).

FIG. 9 shows an input/output table of the code converter 13 of FIG. 8. In FIG. 9, "X" indicates an independent value. As seen from FIG. 8, the input/output characteristic of the code converter 13 is such that only $im_{min}=2i(1\leq i \leq 6)$ bits from the beginning bit of the 12 input bits are coded if the 2i bits are identical to one of 2i bit data words shown in FIG. 7.

In the present case, the input/output of the code converter 13 corresponds to No. 1 in FIG. 9. Only the first "01" of $\alpha$ is encoded independently from the 10 bits following to "01". Accordingly, the code converter 13 produces code word CW=11111, $F_2=1$, $E_2=1$ and I=001. The code converter 13 may be a read-only memory (ROM).

Step 2: The I produced in the step 1 is supplied to a control pulse generator 11. The control pulse generator 11 detects that the content of the shift register 10 has been shifted by 2×I positions, based on the value of I and generates the control pulse CP.

In the present case, since I="001", the control pulse CP is generated after the first two bits of the shift register 10, that is, the underscored bits of $$\alpha = \underline{01}1111111111$$

have been shifted out of the shift register 10.

Step 3: CW=11111 at the output of the code converter 13 is supplied to a parallel-serial converter 14 by the control pulse CP generated in the step 2 and sequentially outputted by the clock $f_r$.

On the other hand, $F_2$ and $E_2$ are supplied to an inversion control circuit 15. $F_2$ is used together with a value E' of $E_2$ of the code word CW' immediately previously sent out and the last bit LB of CW' held in a last bit hold circuit 16, and the inversion control circuit 15 produces a signal $IVN_2$ instructing whether CW is to be sent out in the back pattern or not, in accordance with the concatenation rule of FIG. 6 and supplies the signal $INV_2$ to an exclusive OR gate 17. $INV_2$ is defined by the equation (14).

In the present case, because the data word is the first one, LB and E' have been set to an initial value "0". Since $F_2$="1", $INV_2$="1" from the equation (14) and CW="11111" is sent out in the back pattern.

Step 4: The control pulse CP generated in the step 2 is supplied to the latch circuit 12 in parallel with the step 3 so that a new 12 bits are latched into the latch 12. In the present case, as described in the step 2, the content of the shift register 10 at this moment is 12 bits following the "01" in the equation (16), that is, $$\beta = 111111111111$$

The content of the latch 12 is also $\beta$. The steps 1 to 4 are repeated so that the content of the latch 12 is $$\gamma = 111000011110$$

following the 0111111111111111 of the equation (16). The steps 1 to 4 are repeated to this value $\gamma$.

FIG. 10 shows a time chart for the encoder of FIG. 9 for the data bit sequence of the equation (16). Symbols in FIG. 10 are identical to those used in the description of the steps 0 to 4. Broken lines in FIG. 10 indicate the same time point and "X" indicates an independent value.

Figure 11:
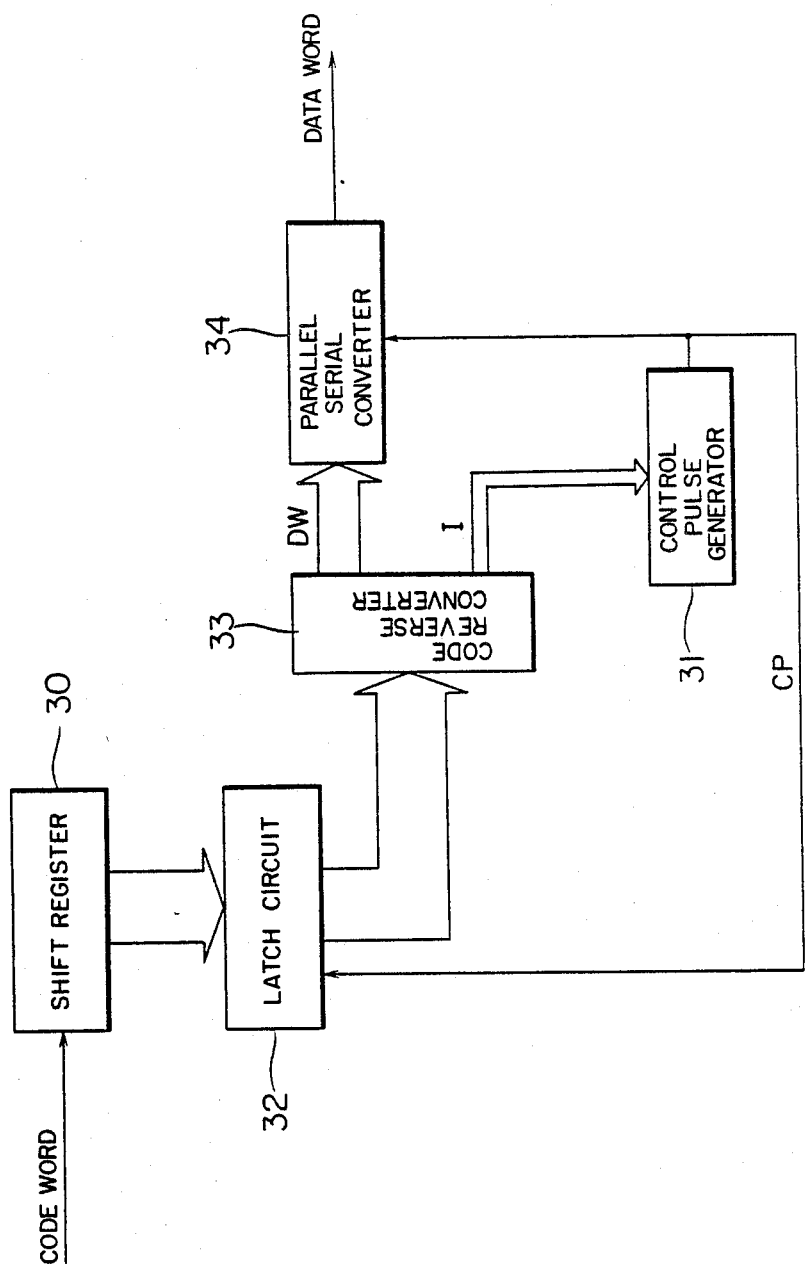
FIG. 11 is a block diagram of a decoder for the RLL code of FIG. 7.

A decoder of the present embodiment will now be explained. If a word boundary in the bit sequence generated by the encoder described above is correctly detected, correct decoding is attained. The code words used in the present embodiment are those which enable correct determination of word boundaries in the bit sequences created by the concatenation. Accordingly, the decoder is constructed as shown in a block diagram of FIG. 11. The operation of the decoder is described below.

Let us assume the following code word, which corresponds to the data bit sequence of the equation (16).

$$\underset{(A')}{00000} \quad \underset{(B')}{111110000000000000000111110000} \tag{17}$$

$$\underset{(C')}{000111111111111} \quad \underset{(D')}{111100000111111110000}$$

Let us assume that (A') in the equation (17) is the beginning of the code word.

Step 0: 30 bits from the beginning of the equation (17), that is, $$\alpha = 000001111100000000000000001111$$

are loaded to a 30-bit shift register 30. The beginning of the code word may be detected by a known method such as by using a mark pattern.

Step 1: The 30 bits loaded to the shift register 30 are latched into a 30-bit latch 32 by a control pulse CP from a control pulse generator 31. The content of the latch 32 is identical to $\alpha'$. The 30 bits latched in the latch 32 are supplied to an input terminal of a code reverse-converter 33, which produces a data word DW corresponding to the input 30 bits and I which indicates the ratio of the number m of bits of DW to $m_{min} = 2$ (I=001 when m=2, I=010 when m=4, I=011 when m=6, I=100 when m=8, I=101 when m=10, I=110 when m=12).

FIG. 12 shows a portion of an input/output table of the code reverse-converter 33. Blanks in the input column of FIG. 12 show that the reverse conversion is independent from the values in the blank areas. The numbers in the remarks are those assigned to the code words of FIG. 7. If, for example, a 30-bit bit sequence starting with "11111" is applied to the input of the code reverse-converter 33 of FIG. 11 and if a code word whose number is shown in the remarks of FIG. 12 is included in the positions after the first ten bits of the 30-bit sequence, the data word "01" corresponding to the code word "11111" is not outputted. As an example, the code word No. 9 in FIG. 12 is equal to No. 121 in FIG. 7 and it is shown in the remarks for No. 1 of FIG. 12. Accordingly, even if the first five bits of No. 9 of FIG. 12 are equal to "11111" of No. 1, the output data word is not "01" but "111111111111".

On the other hand, the first 5i (i=2, 3, 4, 5, 6) bits of a bit sequence $$\underset{\text{No. 1}}{11111} \quad \underset{\text{No. 9}}{000001111111111111111111000001111}$$

which is obtained by concatenating No. 1 and No. 9 of FIG. 12 is not equal to any code word shown in the remarks for No. 1. Accordingly, the data word "01" corresponding to the code word "11111" is outputted.

By using the above input/output table, the word boundary of the code words can be correctly determined.

In the present case, the input/output of the code reverse-converter 33 corresponds to the back pattern of No. 1 of FIG. 12 and the code reverse-converter 33 outputs data word DW="01" and I="001".

Step 2: I obtained in the step 1 is supplied to a control pulse generator 31, which detects that the content of the shift register 30 has been shifted by 5×I bits, based on the value of I and generates a control pulse CP.

In the present case, since I="001", the control pulse CP is generated after the first five bits of the shift register 30, that is, the first five bits "00000" of the $\alpha'$ have been shifted out.

Step 3: DW="01" at the output of the code reverse-converter 33 is supplied to a parallel-serial converter 34 by the control pulse CP generated in the step 2 and sequentially sent out.

Step 4: The control pulse CP generated in the step 2 is applied to the latch 31 in parallel with the step 3 so that a new 30 bits are latched.

As described in the step 2, the content of the shift register 30 is $$\beta' = 111110000000000000000111110000$$

and the content of the latch 31 is also $\beta'$. Thus, the steps 1 to 4 are repeated to obtain a data word "111111111111". Further, the steps 1 to 4 are repeated for the content of the latch 31 of $$\gamma' = \text{"000111111111111111100000111111"}$$

to obtain a data word "111000". Thus, the data word for the equation (17) is 01 111111111111 111000 which is equal to the data bit sequences (A), (B) and (C) of the equation (16) assumed in the description of the operation of the encoder. This means that the correct decoding was attained.

In this manner, the RLL code in which d=5, k=18, $T_w=0.4T$ and $T_{min}=2T$ can be constructed and it has 21% longer $T_w$ and 15% shorter $T_{min}$ as compared with those of the conventional HDM-3 code which has the same $T_{min}=2T$. Because the encoder and the decoder of the present embodiment can be constructed in a simple way, the present embodiment finds many applications to digital image transfer and recording.

Embodiment 2

In the present embodiment, the RLL code in which d=6, k=16, $n_{min}=6$, $m_{min}=2$, $i_{max}=4$, $T_w=T/3$, $T_{min}=2T$ is used. There are 49 code words as shown in FIG. 13 (excluding the back patterns) usable in the present embodiment. FIG. 13 also shows examples of data words corresponding to the code words. Those code words are suitable as the variable length code words as is confirmed in the same manner as that of the embodiment 1 and the relation between the data words and the code words is obtained in the same manner as that of the embodiment 1.

The RLL code of the present embodiment has the same $T_w$ and $T_{min}$ as those of the conventional HDM-3 code and has a k which is smaller by 9. Accordingly, it offers a highly practical advantage.

Embodiment 3

The RLL code of the present embodiment has $d=3$, $k=12$, $n_{min}=15$, $m_{min}=8$, $i_{max}=2$, $T_w=8/15T\approx 0.533T$ and $T_{min}=1.6T$. There are 180 code words having a bit length of $n_{min}=15$ and 19502 code words having a bit length of 30 bits, which are usable in the present embodiment. The 8-bit data words "00000000" to "10110011" are assigned to the 180 15-bit code words and 19456 data words "1011010000000000" to "1111111111111111" are assigned to the 30-bit code words. Accordingly, $19502-19456=46$ 30-bit code words are not used.

The RLL code of the present embodiment has the same d and k as those of the conventional 3PM code and $T_w$ and $T_{min}$ which are longer by approximately 6.7%.

Embodiment 4

The RLL code in the present embodiment has $d=2$, $k=7$, $n_{min}=3$, $m_{min}=2$, $i_{max}=5$, $T_w=2/3T\approx 0.67$ and $T_{min}=4/3T\approx 1.33T$. There are 20 code words as shown in FIG. 14 (excluding the back patterns) usable in the present embodiment. FIG. 14 also shows examples of data words corresponding to the code words. Those code words are suitable for the variable length code words as is confirmed in the same manner as that in the embodiment 1, and the relation between the data words and the code words is obtained in the same manner as that in the embodiment 1.

In the present embodiment, there are six 9, 12 and 15-bit code words as shown in FIG. 15, other than those shown in FIG. 14. However, those code words cannot be combined with the code words of FIG. 14. This is apparent from the following example.

When the code words of FIGS. 14 and 15 are combined, the code words having a bit length of 12 or more are not required and the data word "111111" may be assigned to the code word No. 1 of FIG. 15. However, if the code word No. 3 of FIG. 14 and the code word No. 7 of FIG. 14 appears as shown below.

111000000111
No. 7

It leads to a decoding error in accordance with the decoding algorithm.

The above is caused by the fact that "111111" or "000000" which is not contained in the 6-bit code word appears in both blocks L and R of the 9-bit code word. In such a case, the code must be selected such that six continuous "1" or "0" bits appear in only one of the blocks L and R. In FIG. 14, the code word which allows that six continuous "1" or "0" bits appear in only the block R. When the code word which allows that six continuous "1" or "0" bits appear in only the block L is used, the same advantage as that obtained by the RLL code of FIG. 14 can be offered.

When an equation (18) is met and the equation (13) $(n_i=in_{min})$ is not met, $in_{min}$ continuous "1" or "0" bits are not contained in the $in_{min}$-bit code word and appear in both blocks L and R of $(i+1)$ $n_{min}$-bit code word.

$$in_{min} \leq k-d+1 \quad (18)$$

When $in_{min}$ is in a range defined by an equation (19), the code word having $in_{min}$ continuous bits of the same binary value is excluded only in one of the blocks L and R of the code word having the bit length of $in_{min}$ or more.

$$k-2d+2 < in_{min} \leq k-d+1 \quad (19)$$

In the present embodiment, since $k-d+1=6$, $k-2d+2=5$, $5 < in_{min} \leq 6$ from the equation (19). Thus, the code word having six continuous bits of the same binary value is excluded in only one of the blocks L and R of the code word having 9 or more bit length.

The RLL code of the present embodiment has the same d, $T_w$ and $T_{min}$ as those of the conventional ⅔ conversion code and a k which is smaller by one. Thus, the present RLL code is more suitable for the high density recording and the high speed transfer than the ⅔ conversion code.

Embodiment 5

The RLL code of the present embodiment had $d=3$, $k=8$, $n_{min}=2$, $m_{min}=1$, $i_{max}=3$, $T_w=0.5T$ and $T_{min}=1.5T$.

There are five code words (excluding the back patterns) as shown in FIG. 17, which are usable in the present embodiment and there is no code word having $n_{min}=2$. The present embodiment is attained only by $y=d-\lceil d/2 \rceil =2$ in the equation (15).

FIG. 17 also shows data words corresponding to the code words. Those code words are suitable for the variable length code word as is confirmed in the same manner as that in the embodiment 1 and the relation between the data words and the code words is obtained in the same manner as that in the embodiment 1.

The RLL code of the present embodiment has the same d, k, $T_w$ and $T_{min}$ as those of the conventional (2, 7) RLLC and the maximum bit length of the code word used is 6 in the present code while it is 8 in the (2, 7) RLLC. Accordingly, the hardware and the encoding and decoding algorithm are simplified. Accordingly, the present RLL code offers a greater advantage than the conventional (2, 7) RLLC.

The RLL codes of the embodiments so far described include D.C. components and are not well suitable to a VTR having a DC cut off characteristic.

The encoding and decoding method for the DC free RLL code will now be explained. In the DC free RLL code, the code words used to meet the d, k-constraint are $\{C10_i\}$, $\{C11_i\}$ and their back patterns $\{\overline{C10_i}\}$ and $\{\overline{C11_i}\}$ for $d=1$, and $\{C20_i\}$, $\{C21_i\}$ and theirk back patterns $\{\overline{C20_i}\}$, $\{\overline{C21_i}\}$ for $d<2$.

By appropriately combining those code words, the DSV is retained in a definite range in accordance with the present invention. The combination of the code words for retaining the DSV definitely and the selection and concatenation rule of the code words will now be explained for (III) $d=1$ and (IV) $d\geq 2$.

(III) $d=1$

For the DSV, at the last bit of the first code word, the second code word which meets the d, k-constraint and does not increase $DSV_2$ at the a bit of the second code word is selected.

When the code words $\{C10_i\}$, $\{C11_i\}$ and their back patterns $\{\overline{C10_i}\}$, $\{\overline{C11_i}\}$ are used in accordance with the concatenation rule of the code words shown in FIG. 4, the d, k-constraint is met. In order to prevent divergence of DSV, the following combination of the code words, the assignment of the data words and the selection of the second code word for the DSV, at the last bit of the first code word are utilized.

(III.1) Of the code words $\{C10_i\}$, the code words $\{c100_i\}$ having disparity DP=0 has one-to-one correspondence with the data words. Because $DP_2=0$, $DSV$ at the last bit of c100i is given by equation (20) irrespective of $DSV_1$.

$$DSV_2 = DSV_1 + DP_2 = DSV_1 \quad (20)$$

As seen from the equation (20), the $DSV_2$ is no larger than $DSV_1$. Accordingly, the data words and the code words have the one-to-one correspondence.

(III.2) The code words which start with "1", among the code words having the disparity $DP_2 \neq 0$ in the code words $\{C10_i\}$ are represented by $\{C101_i\}$.

The code word C101i and its back pattern $\overline{C101_i}$ are paired and a data word is assigned to the pair because $DP_2$ must use the code word of the opposite polarity to $DSV_1$ in order to prevent the increase of $DSV_2$ since $DP \neq 0$ in $\{C101_i\}$.

(III.3) The code words having the disparity DP=0 in the code words $\{C11_i\}$ are represented by $\{C110_i\}$ and the back patterns thereof are represented by $\{\overline{C110_i}\}$, C110i and $\overline{C110_i}$ are paired and a data word is assigned to the pair, because of the d, k-constraint. As for $DSV_2$, (III.1) is equally applied.

(III.4) The code words having DP>0 in the code words $\{C11_i\}$ are represented by $\{C11P_i\}$, the code words having DP<0 in $\{C11_i\}$ are represented by $\{C11m_i\}$ and their back patterns are represented by $\{\overline{C11P_i}\}$ and $\{\overline{C11m_i}\}$, respectively.

The four code words $C11P_i$, $C11m_i$, $\overline{C11P_i}$ and $\overline{C11m_i}$ are grouped into one set and a data word is assigned to the set. The combination of $C11P_i$ and $\overline{C11P_i}$ and the combination of $C11m_i$ and $\overline{C11m_i}$ are provided to meet the d, k-constraint, and the combination of $C11P_i$ and $C11m_i$ and the combination of $\overline{C11P_i}$ and $\overline{C11m_i}$ serve to prevent the increase of DSV.

FIG. 18 shows a rule for the combination and selection of the code words in (III.1) to (III.4).

In FIG. 18, DV=0, if $DSV_1 \geq 0$, DV=1 if $DSV_1<0$, P1=1 if DP=0, P1=0 and P2=0 if DP>0, P1=0 and P2=1 if DP<0, P2 is a sign bit of the disparity DP and P1 is derived from inversion of a logical OR of all bits of DP.

Select code SC1 is effective only to (III.4), $C11P_i$ is selected if SC1=0, and C11mi is selected if SC1=1. Select code SC2 indicates that the back pattern is to be selected if SC2=1.

SC1 and SC2 are defined by equations (21) and (22), respectively.

$$SC1 = P1 + (\overline{DV \oplus LB}) \cdot P2 \cdot F_1 \quad (21)$$

$$SC2 = F_1 \cdot LB + \overline{P1 + (\overline{DV \oplus P2})} \quad (22)$$

Where "+" represents a logical OR function.

As seen from the equations (21) and (22), the encoding for the DC free RLL code having d=1 can be implemented by simple logic.

A DC free RLL code encoder constructed in accordance with the systematic encoding method for the DC free RLL code having d=1 of the present invention will now be explained. The decoder is similar to the variable length RLL code decoder shown in FIG. 11 and hence it is omitted here.

Figure 19:
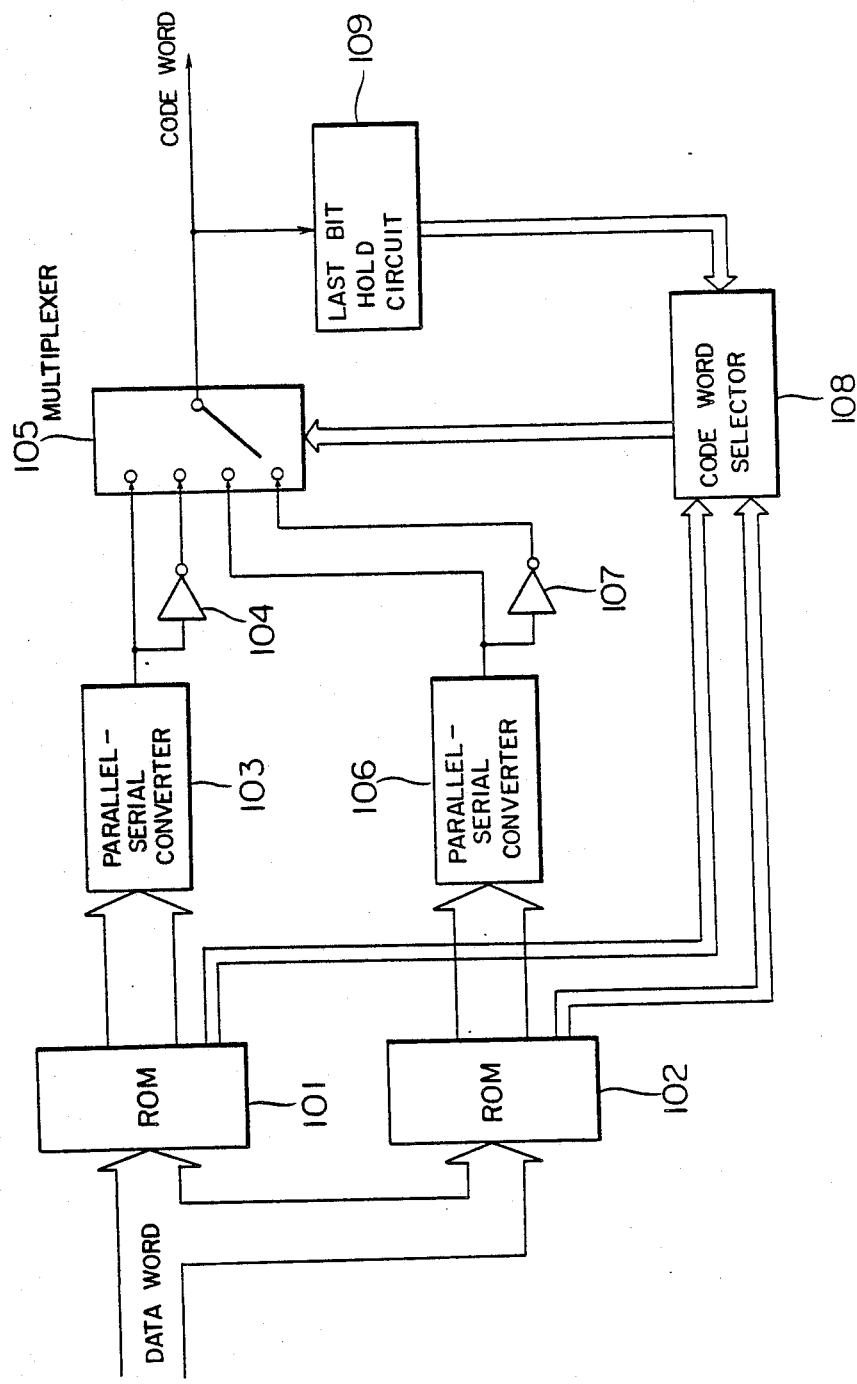
FIG. 19 is a block diagram of an encoder for the DC free RLL code of FIG. 18.

FIG. 19 shows a block diagram for the encoder. The operation is explained below.

An m-bit data word is simultaneously applied to both address terminals of an ROM 101 and an ROM 102. The ROM 101 contains the code words $\{C100_i\}$, $\{C101_i\}$, $\{C110_i\}$, $\{C11P_i\}$, their disparities DP and $F_1$. The ROM 102 contains the code words $\{C11m_i\}$, DP and $F_1$.

The values corresponding to the m-bit data word appear at the output terminals of the ROM 101 and the ROM 102. Of the output from the ROM 101, an n-bit code word is supplied to a parallel-serial converter 103 where it is converted to a serial data, which is then supplied directly on one hand and through an inverter 104 on the other hand to a 4-to-1 multiplexer 105.

Similarly, an n-bit code word at the output terminal of the ROM 102 is supplied to a parallel-serial converter 106 where it is converted to a serial data, which is supplied directly on one hand and through an inverter 107 on the other hand to the multiplexer 105.

A code word selector 108 generates a selection signal to select one of the four code words thus generated. The selector 108 is constructed in accordance with the equations (21) and (22) and operated in accordance with DP and $F_1$ from the ROM 101, the last bit LB of the previously sent code word retained in a last bit hold circuit 109 and DSV at the last bit of the previously sent code word. DSV is calculated by the code word selector 108.

As described above, the DC free RLL code encoder for d=1 in accordance with the present embodiment can be implemented by a simple construction.

A specific configuration of the DC free RLL code having d=1 is explained below.

Embodiment 6

Let us assume a DC free RLL code in which d=1, k=4, m=8, n=10, $T_w=0.8T$ and $T_{min}=0.8T$.

A sample of a video signal is usually quantized to an 8-bit signal. In the present embodiment, such an 8-bit digital vido signal is directly converted to the DC free RLL code.

The present embodiment uses the 10-bit code words shown in FIGS. 20(a) to 20(f). Those code words are selected and combined by the selection rule if (III.1) to (III.4) for d=1, k=4 and n=10. As seen from FIGS. 20(a) to 20(f), there are 353 ($>256=2^8$) code words. Therefore, each of 8-bit data word can be assigned to the code words. (m=8). In the present embodiment, d=1, k=4, n=10 and $T_w=0.8T$. The present code has the same d, $T_w$ and n as those of the conventional 8/10 conversion code and has a k which is 2.5 times as large as that of the conventional 8/10 conversion code.

In FIGS. 20(a) to 20(f), the code words No. 1 to No. 88 and No. 93 to No. 184 belong to $\{C100_i\}$, the code words No. 194 to No. 352 belong to $\{C101_i\}$ and $\{\overline{C101_i}\}$, the code words No. 89 to No. 92 and No. 185 to No. 193 belong to $\{C110_i\}$ and $\{\overline{C110_i}\}$ and the code word No. 353 belongs to {C11P$_i$}, {$\overline{\text{C11P}_i}$}, {C11m$_i$} and {$\overline{\text{C11m}_i}$}.

The selection of 256 code words necessary for the correspondence to the data words, from 353 code words must be determined while taking various factors into consideration. The best way is difficult to select but, as an example, the code words which reduce the variation of DSV are selected for the following reason.

Whatever 256 code words are selected from the 353 code words shown in FIGS. 20(a) to 20(f), the DC component is always zero so long as the concatenation rule of FIG. 18 is followed. While the DC component is zero in a long term average, it slightly varies in a short period. Since the variation width relates to the variation width of DSV, the short term DC component variation is small if the DSV variation width is small. Since the DSV variation width is limited by the disparity DP of the code words used, the code words having small |DP| may be used in order to reduce the DSV variation width.

As seen from FIGS. 20(a) to 20(f), the number of code words having DP=0 is less than 256, and the number of code words having |DP|≦2 are more than 256. Accordingly, only the code words having |DP|≦2 are sufficient for use for correspondence to the data words. Further, even if the code word No. 353 of the code words having |DP|=2 is not used, one-to-one correspondence to the 8-bit data words is attained. Accordingly, in a circuit configuration to generate the (1, 4) DC free code, the ROM 102, parallel-serial converter 106 and inverter 107 in FIG. 19 are eliminated and the select signal SC, in FIG. 18 is not necessary and the equation (21) is not necessary. Accordingly, the code word selector 108 in FIG. 19 is further simplified.

In the present embodiment, x in the equations (3) and (4) is set to 2. When d=1, the number of code words usable for any k and n tends to be maximum when x is given by $$x = \lceil k/2 \rceil \text{ or } x = k - \lceil k/2 \rceil \quad (23)$$

where ⌈ ⌉ is a Gauss symbol.

As described above, in accordance with the present embodiment, the conventional 8-bit digital video signal is directly converted to the DC free RLL code and the k is improved by the factor of 2.5. Such a DC free RLL code can be generated by a very simple circuit. Accordingly, the present embodiment can be applied to digital video magnetic recording as well as digital audio signal recording.

Embodiment 7

The DC free RLL code of the present embodiment had d=1, k=7, m=9, n32 10, T$_w$=0.9T and T$_{min}$=0.9T.

There are 544 code words in the present embodiment when x=3 in the equations (3) and (4). Of those, the code words having |DP|≦4 are shown in FIG. 21 and there are 525 such code words. Since it is larger than $2^9$=512, the one-to-one correspondence between the 9-bit data words and the 10-bit code words is attained.

In the known DC free RLL code having d=1, m=9 and n=10, the minimum k is 8. Accordingly, the present embodiment allows a reduction of k by one. The DC free RLL code having d=1, k=7, m=9, n=10 and |DP|≦4 may also be obtained by selecting x=4 in the equations (2) and (3).

Embodiment 8

The DC free RLL code of the present embodiment has d=1, k=6, m=9, n=10, T$_w$=0.9T, T$_{min}$=0.9T and x=3.

There are 507 code words in the present embodiment. Because the number of code words is smaller than $2^9$, the one-to-one correspondence between the data words and the code words is not attained. However, if probabilities of occurrence of the 9-bit data words are ununiformly distributed, the same code word is assigned to five sets of data words having low probabilities so that five(=512−507) short code words are supplemented.

This code may be used in digital video recording. In the present embodiment, k is reduced by two as compared with the known DC free RLL code having d=1, k=9 and n=10.

Embodiment 9

The DC free RLL code of the present embodiment has d=1, k=6, m=7, n=8, T$_w$=0.875T, T$_{min}$=0.875T and x=3.

There are 132 code words in the present embodiment. They are shown in FIG. 22. As seen from FIG. 22, all code words have |DP|≦4. In the present embodiment, T$_w$=0.875T which is longer than that of a known 8/10 conversion code by 0.07T, and k is smaller by 4. The present embodiment is not attained when x≠3.

Embodiment 10

The DC free RLL code of the present embodiment has d=1, k=7, m=11, n=12, T$_w$=0.92T, T$_{min}$=0.92T and x=3.

There are 2123 code words in the present embodiment and T$_w$≈0.92T. Accordingly, T$_w$ is longer by 0.12T than that of the known 8/10 conversion code and k is smaller by 3. The DC free RLL code having d=1, k=7, m=11 and n=12 may also be generated when x=4.

Embodiment 11

The DC free RLL code of the present embodiment has d=1, k=4, m=12, n=14, T$_w$=0.86T, T$_{min}$=0.86T and x=2.

There are 4275 code words in the present embodiment and T$_w$=0.86T. T$_w$ is longer by 0.06T than that of the know 8/10 conversion code and k is smaller by 6.

Embodiment 12

The DC free RLL code of the present embodiment had d=1, K=5, m=16, n=18, T$_w$=0.89T, T$_{min}$=0.89T and x=2.

There are 94759 code words in the present embodiment and T$_w$=0.89T. Accordingly, T$_w$ is longer by 0.09T than that of the known 8/10 conversion code and k is smaller by 5. The DC free RLL code having d=1, k=5, m=16 and n=18 may also be generated when x=3.

Embodiment 13

The DC free RLL code of the present embodiment had d=1, k=6, m=5, n=6, T$_w$=0.83T and T$_{min}$=0.83T.

There are 35 code words in the present embodiment and T$_w$=0.83T. Accordingly, T$_w$ is longer by 0.03T than that of the known 8/10 conversion code and k is smaller by 4.

Embodiment 14

The DC free RLL code of the present embodiment had $d=1$, $k=7$, $T_w=8/9T$ and $T_{min}=8/9T$.

As seen from the relation between the data words and the code words explained in (III.1)−(III.4), a ratio of the number of code words which can be assigned to data word to the number of code words $\{C10_i\}$, $\{C11_i\}$ is larger when n is an even number and the code word having DP=0 is included than when n is an odd number and the code word having DP=0 is not included. Accordingly, assuming that n is an odd number in m/n conversion, $T_w$ remains unchanged in 2m/2n conversion and the code word length changes to 2n (even number). Accordingly, the 2m/2n conversion DC free RLL code can be attained with a smaller k than that of the m/n conversion DC free RLL code. As described above, $k=14$ in the 8/9 conversion while $k=13$ or less in the 16/18 conversion. However, in the 16/18 conversion, the capacity of the memory used in the encoder and decoder increases as will be discussed later.

Thus, when n is an odd number, a plurality of DC free RLL codes having even number code word lengths are used to attain the 2m/2n conversion DC free RLL code so that k is reduced from that of the m/n conversion DC free RLL code while $T_w$ is kept unchanged and with a smaller memory capacity required for the encoder and decoder than that required when the 2m/2n conversion DC free RLL code is attained by a single code.

In the present embodiment, the 16-bit data word is divided into two sub-data words of 7 bits and 9 bits, which are converted by the 7/8 conversion of the embodiment 9 and the 9/10 conversion of the embodiment 7, and the converted 18-bit code word is recorded at a recording rate $f_r=9/8f_d$, where $f_d$ is a data rate. Accordingly, $T_w=8/9T$.

Figure 23:
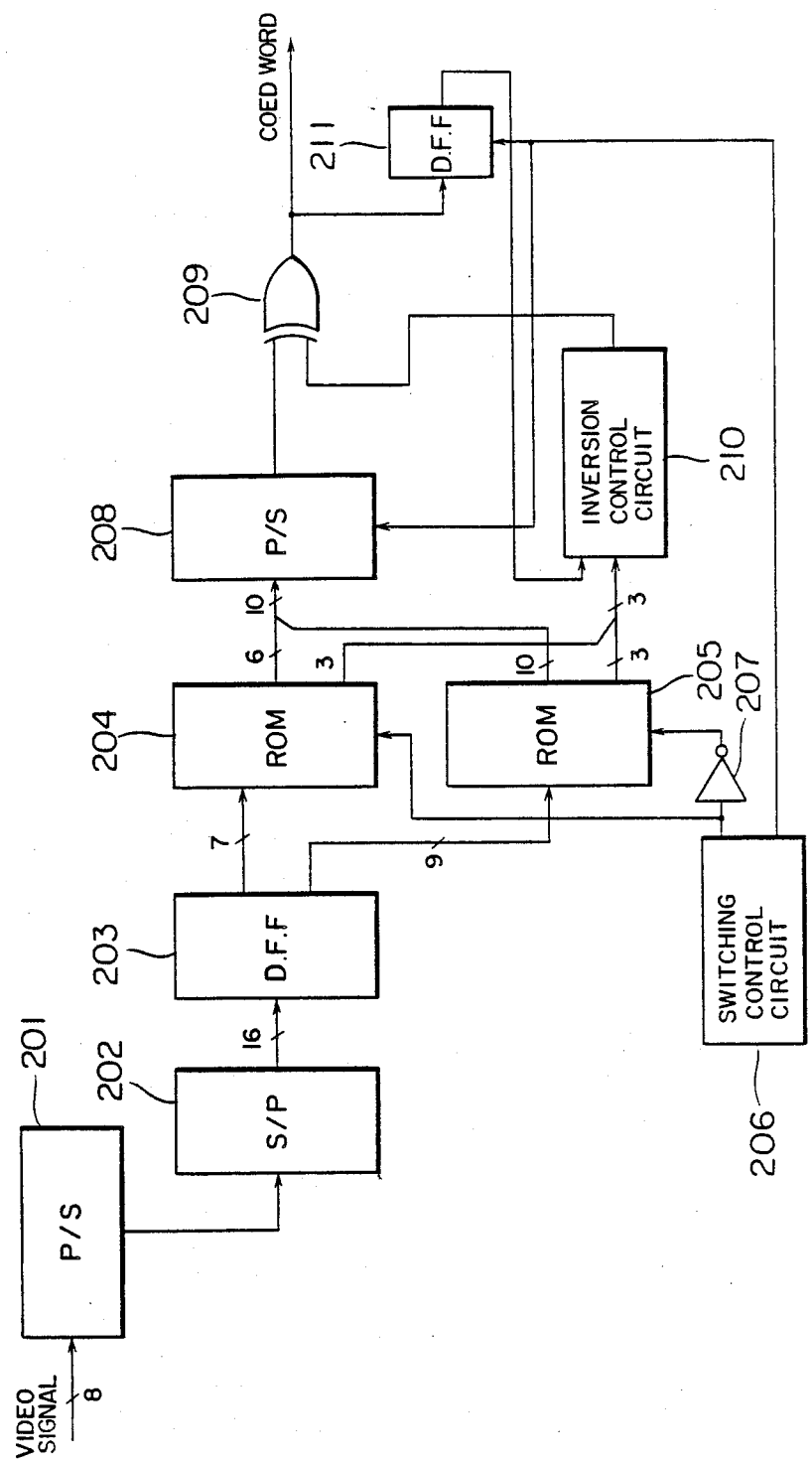
FIG. 23 is a block diagram of an encoder for a 16/18 DC free code in which d=1 and k=7 and which uses two DC free codes of FIGS. 21 and 22.

FIG. 23 shows a block diagram of the encoder of the present embodiment. The operation thereof is described below. When a conventional video signal is digitally processed, it is quantized to an 8-bit video signal which is then supplied to a parallel-serial converter (P/S) 201 of FIG. 23. The bit sequence from the parallel-serial converter 201 is converted to a 16-bit parallel data by a serial-parallel converter (S/P) 202. The 16-bit data comprises two 8-bit video signal words.

The 16-bit data is supplied to a D flip-flop 203, and the high order seven bits of the output thereof are applied to an address input terminal of a read-only memory (ROM) 204 while the low order nine bits thereof are applied to an address input terminal of the ROM 205. That is, the 2-word video signal is divided into the high order 7 bits of the first word and the least significant bit of the first word plus 9 bits of the second word.

The ROM 204 outputs 12 bits, that is, an 8-bit code word corresponding to the 7-bit data word, 3 bits indicating the disparity and 1 bit indicating $F_1$, and the ROM 205 outputs 14 bits, that is, a 10-bit code word corresponding to the 9-bit data word, 3 bits indicating the disparity and 1 bit indicating $F_1$.

In the 9/10 conversion, only the code word which meets $|DP|\leq 4$ in FIG. 21 is used. All code words in FIG. 22 meet $|DP|\leq 4$ and DP=0, ±2, ±4. Therefore, DP can be represented by 3 bits, that is, DP=0: "000", DP=2: "001", DP=−2: "111", DP=4: "010" and DP=−4: "110".

A switching control circuit 206 selects one of the output of the ROM 204 and the output of the ROM 205. A switching control signal is directly applied to a chip select terminal of the ROM 204 and applied to a chip select terminal of the ROM 205 through an inverter 207.

In this manner, the 7/8 converted code word and the 9/10 converted code word are alternately sent out.

The code word supplied from the ROM 204 or the ROM 205 is supplied to a parallel-serial converter (P/S) 208 in which it is converted to a bit sequence which is then supplied to an exclusive OR gate 209.

On the other hand, an inversion control circuit 210 calculates a select code SC2 based on DP and $F_1$ of the code word supplied by the ROM 204 or 205, DSV of the immediately previous code word held in the inversion control circuit 210 and the output LB of the D flip-flop which holds the last bit of the immediately previous code word. The select code SC2 is then supplied to the exclusive OR gate 209 which determines whether the code word is to be converted to the back pattern or not. Thus, the DSV is controlled in either the 7/8 conversion or the 9/10 conversion.

In this manner, the present embodiment can be implemented by a very simple circuit configuration.

In the present embodiment, the code words having F="1" are used. Instead of using the code words having $F_1$="1" and DP="0", such code words may be excluded if the characteristic of the code complies with the characteristic of the communication line. In this case, the number of code words in FIG. 22 is 132 and the number of code words in FIG. 23 is 520 so that both 7/8 conversion and 9/10 conversion can be effected.

When the code words having $F_1$="1" and DP="0" are excluded, the output of the ROM 204 is of 11 bits and the output of the ROM 205 is of 13 bits, and the D flip-flop 211 is not necessary. Thus, the encoder of the present embodiment is further simplified in configuration.

The memory capacity necessary for the encoder of the present embodiment (only for the code words) is $2^7 \cdot 8 + 2^9 \cdot 10 = 6k$ bits which is 1/182 of the memory capacity of $2^{16} \cdot 18 > 1M$ bits which is necessary to effect the 16/18 conversion with one DC free code.

Figure 24:
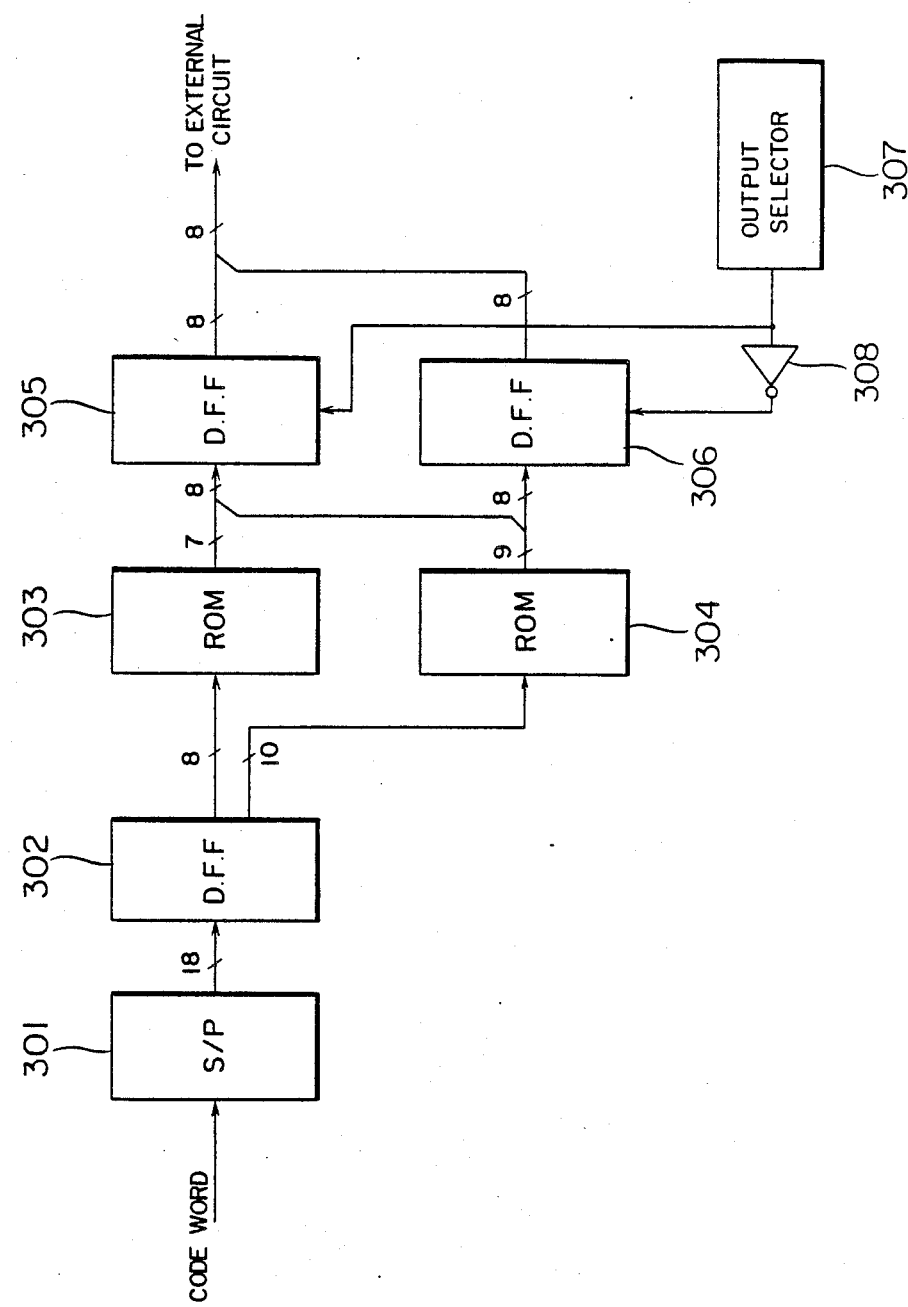
FIG. 24 is a block diagram of a decoder for the RLL code of FIG 23.

FIG. 24 shows a decoder of the present embodiment.

The code word sent over the communication line is converted by a serial-parallel converter (S/P) 301 and a D flip-flop 302 to an 18-bit (two words=8 bits/word + 10 bits/word) parallel signal and the 8 bits are supplied to an input terminal of a ROM 303 while the 10 bits are supplied to an output terminal of a ROM 304. The ROM 303 performs the 8/7 conversion while the ROM 304 performs the 10/9 conversion so that data words corresponding to the input code words are decoded.

Then, the 7 bits from the ROM 303 and the most significant bit of the ROM 304 are supplied to a D flip-flop 305 while the remaining 8 bits of the output from the ROM 304 are supplied to a D flip-flop 306. Thus, the first word in the code conversion is supplied to the D flip-flop 305 and the second word is supplied to the D flip-flop 306.

An output selector 307 sequentially outputs the decoded data words. An output thereof is directly applied to an output control terminal of the D flip-flop 305 and applied to an output control terminal of the D flip-flop 306 through an inverter 308.

In this manner, the decoder of the present embodiment can be implemented by a very simple circuit configuration.

The memory capacity of the ROM in the decoder of the present embodiment is $2^{10} \cdot 9 + 2^8 \cdot 7 \approx 10.8k$ bits which is approximately 1/400 of the memory capacity of $2^{18} \cdot 16 = 4M$ bits which is required for the ROM of the decoder when the 16/18 conversion is performed by one DC free code.

In the present embodiment, two data words are divided into the high order 7 bits of the first word and 9 bits comprising the least significant bit of the first word and the 8 bits of the second word and those two groups are encoded respectively. Accordingly, the propagation of error due to one-bit error in the communication line to other code word is only the least significant bit of the first word at most. Thus, the influence of the error propagation to the image quality is negligible.

As described above, the DC free RLL code of the present embodiment has $d=1$, $k=7$ and is DC free ($|DP| \leq 4$). Thus, a code which is suitable for high density recording can be attained with a very simple circuit configuration, the capacity of the ROM can be significantly reduced and the influence by the error propagation is negligible.

The DC free RLL code of the present embodiment having such characteristics has a high practical value.

In the present embodiment, when $d=1$, many DC free RLL codes having a higher performance than the prior DC free RLL code of $d=1$ are obtained. Other DC free RLL code having a high performance than those shown herein and having $d=1$ can be constructed, although they are not specifically shown herein.

The DC free RLL codes having $d \geq 2$ will now be described.

(IV) $d \geq 2$

Similarly to the case of $d=1$, the second code word (i.e., a code word to be next outputted) is selected, in association with the value $DSV_1$ resulting with the last bit of the first code word (i.e., a code word outputted just precedently) so as to satisfy the d, k-constraint and not to increase the DSV value for the concatenation to the first code word.

The code words $\{C20_i\}$, $\{C21_i\}$ and their back patterns $\{\overline{C20_i}\}$, $\{\overline{C21_i}\}$ are used and the concatenation rule of the code words shown in FIG. 6 is used so that the d, k-constraint is met. In order to prevent the divergence of DSV, the following combinations of code words, the relation to the data words and the selection method of the second code word for the $DSV_1$ for the last bit of the first code word are used.

(IV.1) Of the code words $\{C20_i\}$, the code words which have disparity $DP=0$ are represented by $\{C200_i\}$. The code words $C200_i$ and its back pattern $\overline{C200_i}$ are paired, and a data word is assigned to each pair.

Since $DP_2 = 0$ as is the case of (III.1) where $d=1$, the DSV does not divergently increase and the d, k-constraint is met.

(IV.2) Of the code words $\{C21_i\}$, the code words having disparity $DP=0$ are represented by $\{C210_i\}$. The code word $C210_i$ and its back pattern $\overline{C210_i}$ are paired, and a data word is assigned to each pair for the same reason as in (IV.1).

(IV.3) Of the code words $C20_i$, the code words having $DP>0$ are represented by $\{C20P_i\}$ and the code words having $DP<0$ are represented by $\{C20m_i\}$. Four words $C20P_i$, $C20m_i$ and their back patterns $\overline{C20P_i}$, $\overline{C20m_i}$ are grouped in a set, and a data word is assigned to each set for the same reason as in (III.4) where $d=1$.

(IV.4) Of the code words $\{C21_i\}$, the code words having $DP>0$ are represented by $\{C21P_i\}$ and the code words having $DP<0$ are represented by $\{C21m_i\}$. Four words $C21P_i$, $C21m_i$ and their back patterns $\overline{C21P_i}$, $\overline{C21m_i}$ are grouped in a set, and a data word is assigned to each set for the same reason as in (IV.3).

FIG. 25 shows combinations of the code words (IV.1)–(IV.4) and the rule for selecting the code words.

In FIG. 25, $DV=0$ if $DSV_1 \geq 0$, $DV=1$ if $DSV_1 \leq 0$, $P=0$ if $DP=0$ and $P=1$ if $DP \neq 0$. As for the select codes SC1 and SC2, SC1 = 0 means that the code words $\{C200_i\}$, $\{C210_i\}$, $\{C20P_i\}$, $\{C21P_i\}$ are selected, and SC1 = 1 means that the code words $\{C20m_i\}$, $\{C21m_i\}$ are selected. SC2 = 0 means that the front pattern is selected and SC2 = 1 means that the back pattern is selected, and "X" indicates an independent value.

The SC1 and SC2 in FIG. 25 are defined as follows.

$$SC1 = P \cdot \{DV \oplus LB \oplus (E_2 \cdot F_2)\} \quad (23)$$

$$SC2 = \overline{LB \oplus (E_2 \cdot F_2)} \quad (24)$$

From the equations (23) and (24), SC1 is represented by $$SC1 = P \cdot (DV \oplus \overline{SC2}) \quad (25)$$

The equations (24) and (25) represent actual select code generation logic.

As seen from the equations (24) and (25), the encoding rule for the DC free RLL code for $d \geq 2$, which appears complex at a first glance, can be implemented by very simple logic. This is an advantage of the systematic method of the present invention.

The DC free RLL code encoder for $d \geq 2$ is essentially identical to that for $d=1$ except for the basic differences that the code words $\{C200_i\}$, $\{C210_i\}$, $\{C20P_i\}$, $\{C21P_i\}$ and their DP, $F_2$, $E_2$ are stored in the ROM 101, the code words $\{C20m_i\}$, $\{C21m_i\}$ and their DP are stored in the ROM 102, and the SC1 and SC2 of the code word selecter 108 are defined by the equations (24) and (25).

The DV in FIG. 25 is a sign bit of the DSV and the P in FIG. 25 is derived from an inversion of a logical OR function of all bits of the disparity of the code word.

In this manner, the DC free RLL code for $d \geq 2$ in the present embodiment can be implemented by a very simple configuration.

Specific configurations of the DC free RLL codes for $d \geq 2$ of the present embodiment are described below.

Embodiment 15

In the present embodiment, the DC free RLL code has $d=2$, $k=8$, $m=8$, $n=14$, $T_w=0.57T$ and $T_{min}=1.14T$.

In an present embodiment, the 8-bit data word is directly converted to the code word.

In the present embodiment, 14-bit code words as shown in FIGS. 26(a)–26(i) are used. Those code words have $d=2$, $k=8$ and $n=14$, and are selected and combined in accordance with the selection rules of (IV.1)–(IV.4). As seen from FIGS. 26(a)–26(i), there are 259 code words so that they are assigned to the 8-bit data words, respectively. Accordingly, $T_w = 0.57T$ and $T_w$ is longer by 14% than that of the conventional 8/16 conversion code.

In FIGS. 26(a)–26(i), code words No. 1–No. 26 and No. 59–82 belong to the code words $\{200_i\}$ and $\{\overline{200_i}\}$, the code words No. 27–No. 58 and No. 83–No. 121 belong to the code words $\{210_i\}$ and $\{\overline{210_i}\}$, the code words No. 122–No. 131, No. 146–No. 151, No. 155–No. 160, No. 164–No. 174, No. 182–No. 192, No. 203–No. 216 and No. 235–No. 242 belong to the code words $\{C20P_i\}$, $\{\overline{C20P_i}\}$, $\{C20m_i\}$ and $\{\overline{C20m_i}\}$, and the code words No. 132–No. 145, No. 152–No. 154, No. 161–No. 163, No. 175–No. 181, No. 193–No. 202, No. 217–No. 234 and No. 243–No. 259 belong to the code words $\{C21P_i\}$, $\{\overline{C21P_i}\}$, $\{C21m_i\}$ and $\{\overline{C21m_i}\}$. The maximum value of the disparity DP in the present embodiment is 6.

The DC free RLL code of the present embodiment has 14% longer $T_w$ than the conventional 8/16 conversion code and is suitable for higher density recording.

Embodiment 16

The DC free RLL code of the present embodiment has $d=2$, $k=6$, $m=9$, $n=16$, $T_w=0.56T$ and $T_{min}=1.12T$.

There are 522 code words in the present embodiment and $T_w$ thereof is approximately $0.56T$ which is longer by approximately $0.06T$ than that of the conventional 8/16 conversion code.

Embodiment 17

The DC free RLL code of the present embodiment has $d=2$, $k=9$, $m=4$, $n=8$, $T_w=0.5T$ and $T_{min}=T$.

In the present embodiment, only when an equation (26) is met, the combination of the code words of (IV.5) is possible in addition to the relations (IV.1)–(IV.4) of the data words for $d \geq 2$.

$$n-y<k-d+1 \tag{26}$$

(IV.5.1) Of the code words $\{C20P_i\}$ and the code words $\{C21m_i\}$, the code word $C21mO_i$ in which the number l of continuous bits of the same binary value in the block L is no larger than $d+(k-d+1)-(n-y)$ and their back patterns $\overline{C20_i}$ and $\overline{C21mO_i}$ are grouped in a set, and a data word is assigned to each set.

(IV.5.2) The code word $C20m_i$, the code word $C21PO_i$ of the code words $\{C21P_i\}$ in which l is no larger than $d+(k-d+1)-(n-y)$ and their back patterns $\overline{C20m_i}$ and $\overline{C21PO_i}$ are grouped into a set, and a data word is assigned to each set for the following reason.

Each set includes code words having $DP>0$ and $DP<0$ respectively, so that the divergence of DSV can be prevented by selectively using the code word having DP of the opposite sign to that of $DSV_1$ in a similar way to the cases of (IV.3) and (IV.4).

On the other hand, regarding the d, k-constraint, if the equation (26) is met, the number $\gamma$ of continuous bits of the same binary value in the block R is given by $$\gamma<k-d+1 \tag{27}$$

A maximum value of $\gamma$ which meets the equation (27) is represented by $\gamma_{max}$. In the concatenation of the first code word which has $\gamma_{max}$ "1" bits in the block R and the second word which has l continuous "1" bits in the block L which meets a relation of $$d \leq l \leq d+(k-d+1-\gamma_{max})-1=k-\gamma_{max} \tag{28}$$

the k-constraint is met even if the second code word is not the back pattern. Since $\gamma_{max}$ is given by $$\gamma_{max}=n-y \tag{29}$$

the range of l is given by $$d \leq l \leq k-n+y \tag{30}$$

If the equation (26) is met, the d, k-constraint is met even when the code words of the code words $\{C21m_i\}$ and $\{C21P_i\}$ in which the number l of the continuous bits of the same binary value in the block L is within the range of the equation (30) are combined in the manner shown in (IV.5). For the code words $\{C21PO_i\}$, $\{C21mO_i\}$ and their back patterns $\{\overline{C21PO_i}\}$, $\{\overline{C21mO_i}\}$, $F_2=0$ as an exception. Thus, FIG. 25 need not be changed and $\{C21PO_i\}$ belong to $\{C20P_i\}$ and $\{C21mO_i\}$ belong to $\{C20m_i\}$.

By introducing the combination (IV.5) of the code words, 16 code words shown in FIG. 27 are obtained (excluding the back patterns) and the 4/8 conversion DC free RLL code can be constructed.

In FIG. 27, the code word No. 16 is one by the combination (IV.5.2) of the new code words. The combination of code words in FIG. 26 is just an example. When $d=2$, $k=9$ and $m=8$, then $y=1$, $\gamma_{max}=7$, $k-d+1=8$ and, from the equation (30), $l=2$.

In the present embodiment, d and $T_w$ are equal to those in the conventional 8/16 conversion DC free RLL code and k is larger by 3. However, the code length is one half and the memory capacity required for the encoder and the decoder is significantly reduced. For example, the memory capacity of the decoder is reduced by a factor of $$\frac{2^8 \cdot 4}{2^{16} \cdot 8} = \frac{1}{512}.$$

Accordingly, for the communication line which is not severe to the k-constraint, the present invention is effective in total.

As described above, when $d \geq 2$, many DC free RLL codes having a higher performance than the conventional DC free RLL code having $d \geq 2$ can be constructed.

Many DC free RLL codes other than those having $d \geq 2$ described above and having excellent performance can be constructed, although they are not specifically described.

As described hereinabove, in accordance with the present invention, in order to meet the d, k-constraint, the code word is divided into three blocks L, B and R and constraints for the blocks L, B and R which are uniquely defined for a given d and k are introduced. By selecting the code words based on those constraints, the RLL codes can be readily constructed. Many of the RLL codes thus constructed have higher performance than the conventional RLL code.

Unique methods are introduced in combining the code words for constructing the DC free RLL code and assigning the data words. Accordingly, many DC free RLL codes having higher performance than the conventional RLL code can be contructed.

Thus, the present invention provides method and apparatus which are very advantageous for constructing an effective RLL code.

What is claimed is:

1. A method for generating a run length limited code which meets a d, k-constraint in which the minimum number of continuous bits having the same binary value is limited to d and the maximum number of continuous bits having the same binary value is limited to k, by converting $m_i$-bit data words to $n_i$-bit code words, where $1 \leq i \leq i_{max}$, to generate $2^{n_i}$ $n_i$-bit bit patterns, comprising the steps of: dividing each of said bit patterns into a leading block L having l continuous bits of the same binary value, an end block R having $\gamma$ continuous bits of the same binary value and an intermediate block B having $b(=n_i-l-\gamma)$ bits between the blocks L and R; and selecting as the $n_i$-bit code words to be used in the $m_i/n_i$ conversion patterns which perfectly meet the d, k-constraint in the block B.

2. A method according to claim 1, wherein d=1 and only code words $\{C10_i\}$ which meet $1 \leq l \leq x$ and $1 \leq \gamma \leq k-x$, where $1 \leq x \leq k-1$ and the code words $\{CX11_i\}$ which meet $x+1 \leq l \leq k$ and $1 \leq \gamma \leq k-x$ are used.

3. A method according to claim 2, wherein code words which belong to the code words $\{CX11_i\}$ and have "1" bits in the block L are represented by $\{C11_i\}$, a code word $C11_i$ is called a front pattern, a code word having "1"s in the front code $C11_i \epsilon \{C11_i\}$ changed to "0"s and "0"s in the front code $C11_i \epsilon \{C11_i\}$ changed to "1"s is called a back pattern $\overline{C11_i} \epsilon \{\overline{C11_i}\}$, a data word is assigned to each code word $C10_i \epsilon \{C10_i\}$, the code words $C11_i$ and its back pattern $\overline{C11_i} \epsilon \{\overline{C11_i}\}$ are paired and a data word is assigned to each pair.

4. A method according to claim 3, wherein the code words are concatenated in accordance with $INV_i=LB \cdot F_1$ where LB is the binary value of the block R of the first code word, $F_1=0$ if the second code word belongs to $\{C10_i\}$, $F_1=1$ if the second code word belongs to $\{C11_i\}$, $INV_1=0$ if the second code word is the front pattern and $INV_1=1$ if the second code word is the back pattern.

5. A method according to claim 3, wherein a data word is assigned to each of code words $C100_i \epsilon \{C100_i\}$ of the code words $\{C10_i\}$ having zero disparity (DP=0) defined by a difference between the numbers of "1"s and "0"s in the code word, a data word is assigned to each two-word set of a code word $C110_i \epsilon \{C110_i\}$ having DP=0 of the code words $\{C11_i\}$ and a back pattern $\overline{C110_i} \epsilon \{\overline{C110_i}\}$ thereof, a data word is assigned to each set of a code word $C10P_i \epsilon \{C10P_i\}$ having DP>0 of the code words $\{C10_i\}$ and a back pattern $\overline{C10P_i} \epsilon \{\overline{C10P_i}\}$ thereof, a data word is assigned to each two-word set of a code word $C10m_i \epsilon \{C10m_i\}$ having DP<0 of the code words $\{C10_i\}$ and a back pattern $\overline{C10m_i} \epsilon \{\overline{C10m_i}\}$ thereof, and a data word is assigned to each four-word set of a code word $C11P_i \epsilon \{C11P_i\}$ having DP>0 of the code words $\{C11_i\}$, a back pattern $\overline{C11P_i} \epsilon \{\overline{C11P_i}\}$ thereof, a code word $C11m_i \epsilon \{C11m_i\}$ having DP<0 of the code words $\{C11_i\}$ and a back pattern $\overline{C11m_i} \epsilon \{\overline{C11m_i}\}$ thereof.

6. A method according to claim 5, wherein the code words are concatenated in accordance with $$SC_1 = \overline{P_1 + (DV \oplus LB)} \cdot P_2 \cdot F_1$$

$$SC_2 = F_1 \cdot LB + \overline{P_1 + (DV \oplus P_2)}$$

where LB is the binary value of the bits of the block R of the first code word, DV=0 if $DSV_1 \geq 0$ at the last bit of the first code word, DV=1 if $DSV_1<0$, $P_1=1$ if $DP_2=0$ in the second code word, $P_1=0$ if $DP_2 \neq 0$, $P_2=0$ if $DP_2>0$, $P_2=1$ if $DP_2<0$, $SC_1=0$ if the second code word belongs to $\{C100_i\}$, $\{C110_i\}$, $\{C10P_i\}$, $\{C10m_i\}$ or $\{C11P_i\}$, $SC_1=1$ if the second code word belongs to $\{C11m_i\}$, $CS2=0$ if the second code word is the front pattern and SC2=1 if the second code word is the back pattern.

7. A method according to claim 6, wherein $i_{max}=1$, d=1, k=4, m=8, n=10 and x=2.

8. A method according to claim 7, where only code words haviang $|DP| \leq 2$ are used.

9. A method according to claim 6, wherein $i_{max}=1$, d=1, k=7, m=9, n=10 and x=3.

10. A method according to claim 9, wherein only code words having $|DP| \leq 4$ are used.

11. A method according to claim 6, wherein $i_{max}=1$, d=1, k=7, m=9, n=10 and x=4.

12. A method according to claim 11, wherein only code words having $|DP| \leq 4$ are used.

13. A method according to claim 6, wherein $i_{max}=1$, d=1, k=6, m=9, n=10, x=3 and the same code word is assigned only to fine data words.

14. A method according to claim 6, wherein $i_{max}=1$, d=1, k=6, m=7, n=8 and x=3.

15. A method according to claim 6, wherein $i_{max}=1$, d=1, k=7, m=11, n=12 and x=3.

16. A method according to claim 6, wherein $i_{max}=1$, d=1, k=7, m=11, n=12 and x=4.

17. A method according to claim 6, wherein $i_{max}=1$, d=1, k=4, m=12, n=14 and x=2.

18. A method according to claim 6, wherein $i_{max}=1$, d=1, k=5, m=16, n=18 and x=2.

19. A method according to claim 6, wherein $i_{max}=1$, d=1, k=5, m=16, n=18 and x=3.

20. A method according to claim 6, wherein $i_{max}=1$, d=1, k=6, m=5, n=6 and x=3.

21. A method according to claim 4, wherein $i_{max}$ $m_i/n_i$ conversion code are used to perform m/n conversion where $$m = \sum_{i=1}^{i_{max}} m_i \text{ and } n = \sum_{i=1}^{i_{max}} n_i.$$

22. A method according to claim 6, wherein $i_{max}$ $m_i/n_i$ conversion code are used to perform m/n conversion where $$m = \sum_{i=1}^{i_{max}} m_i \text{ and } n = \sum_{i=1}^{i_{max}} n_i.$$

23. A method according to claim 22, wherein $n_i$ is an even number.

24. A method according to claim 23, wherein divergence of DSV is prevented for each $m_i/n_i$ conversion.

25. A method according to claim 24, wherein $i_{max}=2$, d=1, $m_1=7$, $n_1=8$, $n_2=9$ and $n_2=10$.

26. A method according to claim 25, wherein of a 16-bit data word comprising two 8-bit data words, high order 7 bits of the first data word are 7/8 converted and 9 bits consisting of the least significant bit of the first data word and the 8 bits of the second data word are 9/10 converted.

27. A method according to claim 26, wherein RLL code having d=1, k=7, $m_1=7$, $n_1=8$ and x=3 in the $m_1/n_1$ conversion and RLL code having $m_2=9$ and $n_2=10$ in the $m_2/n_2$ conversion are used, where d=1, k=7, m=16 and n=18.

28. A method according to claim 26, wherein RLL code having d=1, k=7, $m_1=7$, $n_1=8$, x=3 and $|DP| \leq 4$ in the $m_1/n_1$ conversion and RLL code having $m_2=9$ and $n_2=10$ in the $m_2/n_2$ conversion are used, where $d=1$, $k=7$, $m=16$ and $n=18$.

29. A method according to claim 26, wherein RLL code having $m_1=7$ and $n_1=8$ in the $m_1/n_1$ conversion and RLL code having $m_2=9$ and $n_2=10$ in the $m_2/n_2$ conversion used, where $d=1$, $k=7$, $m=16$ and $n=18$.

30. A method according to claim 1, wherein only the code words having $y \leq l \leq k-d+1$ and $d-y \leq \gamma \leq k-d+1$ where $1 \leq y \leq d-1$ are used.

31. A method according to claim 30, wherein a data word is assigned to each two-word set of a code word $C20_i \epsilon \{C20_i\}$ having $1 \leq d$ and starting with "1" and a back pattern $\overline{C20_i} \epsilon \{\overline{C20_i}\}$ thereof, and a data word is assigned to each two-word set of a code word $C21_i \epsilon \{C21_i\}$ having $1 \leq d$ and a back pattern $\overline{C21_i} \epsilon \{\overline{C21_i}\}$ thereof.

32. A method according to claim 31, wherein code words are concatenated in accordance with $INV_2 = \overline{LB} \oplus (E_2 \cdot F_2)$ where LB is the binary value of the bits of the block R of the first code word, $E_2=0$ if $\gamma \leq d-1$ in the first code word, $E_2=1$ if $\gamma \geq d$, $F_2=0$ if $l \leq d-1$ in the second code word, $F_2=1$ if $l \geq d$, $INV_2=0$ if the second code word is the front pattern and $INV_2=1$ if the second code word is the back pattern.

33. A method according to claim 32, wherein $m_i = im_{min}$ and $n_i = in_{min}$.

34. A method according to claim 33, wherein $d \leq 3$.

35. A method according to claim 34, wherein $i_{max}=6$, $d=5$, $k=18$, $m_{min}=2$, $n_{min}=5$ and $y=2$.

36. A method according to claim 34, wherein $i_{max}=6$, $d=5$, $k=18$, $m_{min}=2$, $n_{min}=5$ and $y=3$.

37. A method according to claim 34, wherein $i_{max}=4$, $d=6$, $k=16$, $m_{min}=2$ and $n_{min}=6$.

38. A method according to claim 34, wherein $i_{max}=2$, $d=3$, $k=12$, $m_{min}=8$ and $n_{min}=15$.

39. A method according to claim 33, wherein when $k-2d+2 \leq in_{min} \leq k-d+1$ is met, code words having $in_{min}$ bits of the same binary value in one of the blocks L and R are excluded from the code words having no less than $(i+1)n_{min}$ bits.

40. A method according to claim 39, wherein $i_{max}=5$, $d=2$, $k=7$, $m_{min}=2$, $n_{min}=3$ and $y=1$.

41. A method according to claim 33, wherein $n_{min}$-bit code words are not used when $n_{min} < d$.

42. A method according to claim 41, wherein $i_{max}=3$, $d=3$, $k=8$, $m_{min}=1$, $n_{min}=2$ and $y=2$.

43. A method according to claim 31, wherein a data word is assigned to each two-word set of a code word $C200_i \epsilon \{C200_i\}$ having $DP=0$ of the code words $\{C20_i\}$ and a back pattern $\overline{C200_i} \epsilon \{\overline{C200_i}\}$ thereof, a data word is assigned to each set of a code word $C210_i \epsilon \{C210_i\}$ having $DP=0$ of the code words $\{C21_i\}$ and a back pattern $\overline{C210_i} \epsilon \{\overline{C210_i}\}$ thereof, a data word is assigned to each four-word set of a code word $C20P_i \epsilon \{C20P_i\}$ having $DP>0$ of the code words $\{C20_i\}$, a back pattern $\overline{C20P_i} \epsilon \{\overline{C20P_i}\}$ thereof, a code word $C20m_i \epsilon \{C20m_i\}$ having $DP<0$ of the code words $\{C20_i\}$ and a back pattern $\overline{C20m_i} \epsilon \{\overline{C20m_i}\}$ thereof, and a data word is assigned to each four-word set of a code word $C21P_i \epsilon \{C21P_i\}$ having $DP>0$ of the code words $\{C21_i\}$, a back pattern $\overline{C21P_i} \epsilon \{\overline{C21P_i}\}$ thereof, a code word $\overline{C21m_i} \epsilon \{\overline{C21m_i}\}$ having $DP<0$ of the code words $\{C21_i\}$ and a back pattern $C21m_i \epsilon \{C21m_i\}$ thereof.

44. A method according to claim 43, wherein the code words are concatenated in accordance with $$SC2 = \overline{LB} \oplus (E_2 \cdot F_2)$$

$$SC1 = P \cdot (DV \oplus \overline{SC2})$$

where LB is the binary value of the bits of the block R of the first code word, $DV=0$ if $DSV_1 \geq 0$ at the last bit of the first code word, $DV=1$ if $DSV_1<0$ $P=0$ if $DP_2=0$ in the second code word, $P=1$ if $DP_2 \neq 0$, $SC1=0$ if the second code words belongs to $\{C200_i\}$, $\{C210_i\}$, $\{C20_i\}$ or $\{C21P_i\}$, $SC1=1$ if the second code word belongs to $\{C20m_i\}$ or $\{C21m_i\}$, $SC2=0$ if the second code word is the front pattern, and $SC2=1$ if the second code word is the back pattern.

45. A method according to claim 44, wherein $i_{max}=1$, $d=2$, $k=8$, $m=8$ and $n=14$.

46. A method according to claim 44, wherein $i_{max}=1$, $d=2$, $k=6$, $m=9$ and $n=16$.

47. A method according to claim 44, wherein when a maximum number $\gamma_{max}$ of continuous bits of the same binary value in the block R of the code word is smaller than $k-d+1$, a data word is assigned to each four-word set of a code word $C20P_i \epsilon \{C20P_i\}$, a back pattern $\overline{C20P_i} \epsilon \{\overline{C20P_i}\}$ thereof, a code word $C21m0_i \epsilon \{C21m0_i\}$ and a back pattern $\overline{C21m0_i} \epsilon \{\overline{C21m0_i}\}$ thereof, for the code words $\{C21P0_i\}$ and $\{C21m0_i\}$ having $d \leq l \leq k-n+y$, of the code words $\{C21P_i\}$ and $\{C21m_i\}$, and a data word is assigned to each four-word set of a code word $C20m_i \epsilon \{C20m_i\}$, a back pattern $\overline{C20m_i} \epsilon \{\overline{C20m_i}\}$ thereof, a code word $\overline{C21P0_i} \epsilon \{\overline{C21P0_i}\}$ and a back pattern $C21P0_i \epsilon \{C21P0_i\}$ thereof, and the code word $\{C21P0_i\}$ are included in $\{C20P_i\}$ and the code words $\{C21m0_i\}$ are included in $\{C20m_i\}$ when the code words are concatenated.

48. A method according to claim 47, wherein $i_{max}=1$, $d=2$, $k=9$, $m=4$ and $n=8$.

49. A code conversion apparatus for generating a run length limited code which meets a d, k-constraint in which the minimum number of continuous bits having the same binary value is limited to d and the maximum number of continuous bits having the same binary value is limited to k, by converting $m_i$-bit data words to $n_i$-bit code words, where $1 \leq i \leq i_{max}$, comprising:

code word generation means for generating an $n_i$-bit code word having $l$ continuous bits of the same binary value in a leading block L of the code word, $\gamma$ continuous bit of the same binary value in an end block R and an intermediate block B consisting of $b(=n_i-l-\gamma)$ bits between the blocks L and R which perfectly meets the d, k-constraint;

block R information generation means for generating information about the block R of the first code word in concatenating the first code word and the second code word generated by said code word generation means;

second code word information generation means for generating information about the second code word; and second code word selection/modification means for selecting or modifying the second code word in accordance with the information from said block R information generation means and said second code word information generation means.

50. A code conversion apparatus according to claim 49, wherein the code words generated by said code word generation means have $1 \leq l \leq x$ and $1 < \gamma \leq k-x$ or $x+1 \leq l \leq k$ and $1 \leq \gamma \leq k-x$, where $1 \leq x \leq k-1$.

51. A code conversion apparatus according to claim 50, wherein said block R information generation means includes means for holding the binary value LB of the bits of the block R of the first code word, said second code word information generation means includes means for generating $F_1=0$ if $1 \leq x$ and $F_1=1$ if $l > x+1$, and said second code word selection 1 modification means includes means for calculating $F_1 \cdot LB$ and means for outputting the second code word as it is if $F_1 \cdot LB = 0$ and in the front pattern if $F_1 \cdot LB = 1$.

52. A code conversion apparatus according to claim 50, wherein said block R information generation means includes means for holding the binary value LB of the bits of the block R of the first code word, said second code word information generation means includes means for generating $F_1=0$ if $1 \leq x$ in the second code word and $F_1=1$ if $l \geq x+1$, and said second code word selection/modification means includes means for generating $DV=0$ if $DSV_1 > 0$ at the last bit of the first code word and $DV=1$ if $DSV_1 < 0$, means for generating $P_1=1$ if $DP_2=0$ the disparity of the second code word, $P_1=0$ and $P_2=0$ if $DP_2>0$, and $P_1=0$ and $P_2=1$ if $DP_2<0$, means for calculating $SC1 = \overline{P_1 + (DV \oplus LB)} \cdot P_2 \cdot F_1$, means for selecting code word having $F_1=1$ and $DP_2<0$ is the second code word only when $SC1=1$, means for calculating $SC2 = F_1 \cdot LB + \overline{P_1 + (DV \oplus P_2)}$ and means for outputting the second code word as it is if $SC2=0$ and in the back pattern if $SC2=1$.

53. A code conversion apparatus according to claim 52, wherein $i_{max}=1$, $d=1$, $k=4$, $m=8$, $n=10$ and $x=2$.

54. A code conversion apparatus according to claim 53, wherein only code words having $|DP| \leq 2$ are used.

55. A code conversion apparatus according to claim 52, wherein $i_{max}=1$, $d=1$, $k=7$, $m=9$, $n=10$ and $x=3$.

56. Aa code conversion apparatus according to claim 55, wherein only code words having $|DP| \leq 4$ are used.

57. A code conversion apparatus according to claim 55, wherein $i_{max}=1$, $d=1$, $k=7$, $m=9$, $n=10$ and $x=4$.

58. A code conversion apparatus according to claim 57, wherein only code words having $|DP| \leq 4$ are used.

59. A code conversion apparatus according to claim 52, wherein $i_{max}-1$, $d=1$, $k=6$, $m=9$, $n=10$, $x=3$ and the same code word is assigned only to five data words.

60. A code conversion apparatus according to claim 52, wherein $i_{max}=1$, $d=1$, $k=6$, $m=7$, $n=8$ and $x=3$.

61. A code conversion apparatus according to claim 52, wherein $i_{max}=1$, $d=1$, $k=7$, $m=11$, $n=12$ and $x=3$.

62. A code conversion apparatus according to claim 52, wherein $i_{max}=1$ $d=1$, $k=7$, $m=11$, $n=12$ and $x=4$.

63. A code conversion apparatus according to claim 52, wherein $i_{max}=1$, $d=1$, $k=4$, $m=12$, $n=14$ and $x=2$.

64. A code conversion apparatus according to claim 52, wherein $i_{max}=1$, $d=1$, $k=5$, $m=16$, $n=18$ and $x=2$.

65. A code conversion apparatus according to claim 52, wherein $i_{max}=1$, $d=1$, $k=5$, $m=16$, $n=18$ and $x=3$.

66. A code conversion apparatus according to claim 52, wherein $i_{max}=1$, $d=1$, $k=6$, $m=5$, $n=6$ and $x=3$.

67. A code conversion apparatus according to claim 52, wherein $i_{max}=2$, $d=1$, $m_1=7$, $n_1=8$, $n_2=9$ and $n_2=10$.

68. A code conversion apparatus according to claim 67, wherein of a 16-bit data word comprising two 8-bit data words, high order 7 bits of the first data word are ⅞ converted and 9 bits consisting of the least significant bit of the first data word and the 8 bits of the second data word are 9/10 converted.

69. A code conversion apparatus according to claim 68, wherein only code words having $|DP| \leq 4$ are used.

70. A code conversion apparatus according to claim 49, wherein the code words generated by said code word generation means have $y \leq l \leq k-d+1$ and $d-y < \gamma \leq k-d+1$ when $1 \leq y \leq d-1$.

71. A code conversion apparatus according to claim 70, wherein said block R information generation means includes means for holding the binary value LB of the bits of the block R of the first code word, means for generating $E_2=0$ if $\gamma \leq d-1$ and $E_2=1$ if $\gamma \geq d$ where $\gamma$ is the number of continuous bits of the same binary value in the block R of the first code word, said second code word information generation means includes means for generating $F_2=0$ if $l \leq d-1$ and $F_2=1$ if $l \geq d$ where l is the number of continuous bits of the same binary value in the block L, and said second code word selection 1 modification means includes means for calculating $INV_2 = LB \oplus (E_2 \cdot F_2)$ and outputting the second code word in the front pattern when $INV_2=0$ and in the back pattern when $INV_2=1$.

72. A code conversion apparatus according to claim 71, wherein $m_i = im_{min}$ and $n_i = in_{min}$.

73. A code conversion apparatus according to claim 72, wherein $i_{max}=6$, $d=5$, $k=18$, $m_{min}=2$, $n_{min}=5$ and $y=2$.

74. A code conversion apparatus according to claim 72, wherein $i_{max}=6$, $d=5$, $k=18$, $m_{min}=2$ and $n_{min}=5$ and $y=3$.

75. A code conversion apparatus according to claim 72, wherein $i_{max}=4$, $d=6$, $k=16$, $m_{min}=2$ and $n_{min}=6$.

76. A code conversion apparatus according to claim 72, wherein $i_{max}=2$, $d=3$, $k=12$, $m_{min}=8$ and $n_{min}=15$.

77. A code conversion apparatus according to claim 72, wherein when $in_{min} \leq MAX\{k-d+1+y-n_{min}, k-2(d-1)+1\}$ is met, code words having $in_{min}$ bits of the same binary value in one of the blocks L and R are excluded from the code words having no less than $(i+1)n_{min}$ bits.

78. A code conversion apparatus according to claim 77, wherein $i_{max}=5$, $d=2$, $k=7$, $m_{min}=2$, $n_{min}=3$ and $y=1$.

79. A code conversion apparatus according to claim 72, wherein $n_{min}$-bit code words are not used when $n_{min} < d$.

80. A code conversion apparatus according to claim 79, wherein $i_{max}=3$, $d=3$, $k=8$, $m_{min}=1$, $n_{min}=2$ and $y=2$.

81. A code conversion apparatus according to claim 71, wherein said second code word selection/modification means includes means for calculating $SC2 = LB \oplus (E_2 \cdot F_2)$, means for outputting the second code word in the front pattern when $SC2=0$ and in the back pattern when $SC2=1$, means for generating $DV=0$ when $DSV_1 \geq 0$ at the last bit of the first code word and $DV=1$ when $DSV_1 0$, means for generating $P=0$ when $DP=0$ in the second code word and $P=1$ when $DP \neq 0$, means for calculating $SC1 = P \cdot (DV \oplus CS2)$, and means for selecting a code word having $DP<0$ for the front pattern as the second code word when $SC1=1$.

82. A code conversion apparatus according to claim 81, wherein $i_{max}=1$, $d=2$, $k=8$, $m=8$ and $n=14$.

83. A code conversion apparatus according to claim 81, wherein $i_{max}=1$, $d=2$, $k=6$, $m=9$ and $n=16$.

84. A code conversion apparatus according to claim 81, wherein when a maximum number $\gamma_{max}$ of continuous bits of the same binary value in the block R of the code word is smaller than $k-d+1$, $F_2=0$ is imported to the code word having $d \leq l \leq k=n+y$.

85. A code conversion apparatus according to claim 84, wherein $i_{max}=1$, $d=2$, $k=9$, $m=4$ and $n=8$.

* * * * *